United States Patent
Katsurahira et al.

(10) Patent No.: US 10,768,723 B2
(45) Date of Patent: Sep. 8, 2020

(54) ELECTRONIC PEN AND ELECTRONIC PEN MAIN BODY

(71) Applicant: Wacom Co., Ltd., Saitama (JP)

(72) Inventors: Yuji Katsurahira, Saitama (JP); Toru Eguchi, Chiba (JP)

(73) Assignee: Wacom Co., Ltd., Saitama (JP)

(*) Notice: Subject to any disclaimer, the term of this patent is extended or adjusted under 35 U.S.C. 154(b) by 126 days.

(21) Appl. No.: 15/697,070

(22) Filed: Sep. 6, 2017

(65) Prior Publication Data
US 2018/0011557 A1 Jan. 11, 2018

Related U.S. Application Data

(63) Continuation of application No. PCT/JP2016/058321, filed on Mar. 16, 2016.

(30) Foreign Application Priority Data

Mar. 31, 2015 (JP) ................................ 2015-071806

(51) Int. Cl.
*G06F 3/038* (2013.01)
*G06F 3/044* (2006.01)
(Continued)

(52) U.S. Cl.
CPC .............. *G06F 3/0383* (2013.01); *G06F 3/03* (2013.01); *G06F 3/03545* (2013.01);
(Continued)

(58) Field of Classification Search
CPC .............................. G06F 3/03545; G06F 3/046
(Continued)

(56) References Cited

U.S. PATENT DOCUMENTS

| 6,092,951 A * | 7/2000 | Greene ................. B43K 24/00 401/195 |
| 6,278,440 B1 * | 8/2001 | Katsurahira ........ G06F 3/03543 178/18.07 |

(Continued)

FOREIGN PATENT DOCUMENTS

| EP | 1 837 744 A2 | 9/2007 |
| JP | 7-41629 U | 7/1995 |

(Continued)

OTHER PUBLICATIONS

European Search Report, dated Oct. 26, 2018, for European Application No. 16772301.4-1216, 9 pages.

*Primary Examiner* — Yuzhen Shen
(74) *Attorney, Agent, or Firm* — Seed IP Law Group LLP

(57) ABSTRACT

An electronic pen includes a magnetic core that has a through-hole and around which a coil is wound in a direction along this through-hole, a core body that is inserted in the through-hole of this magnetic core and has electrical conductivity, a capacitor that forms a resonant circuit with the coil, a signal generation circuit that generates a signal that enables a position of the electronic pen to be detected, which is transmitted through the core body, an electricity storage device, and a charge circuit that charges the electricity storage device by an induced current generated in the coil according to an external magnetic field. While the resonant circuit operates, the signal generated by the signal generation circuit is concurrently transmitted through the core body.

15 Claims, 12 Drawing Sheets

(51) Int. Cl.
*G06F 3/046* (2006.01)
*G06F 3/041* (2006.01)
*G06F 3/03* (2006.01)
*G06F 3/0354* (2013.01)

(52) U.S. Cl.
CPC .............. *G06F 3/041* (2013.01); *G06F 3/044* (2013.01); *G06F 3/046* (2013.01); *G06F 2203/04105* (2013.01); *G06F 2203/04107* (2013.01)

(58) Field of Classification Search
USPC ......................................................... 345/179
See application file for complete search history.

(56) References Cited

U.S. PATENT DOCUMENTS

| | | | |
|---|---|---|---|
| 8,304,671 B2 | 11/2012 | Fukushima et al. | |
| 8,913,041 B2 | 12/2014 | Fukushima et al. | |
| 9,052,785 B2 | 6/2015 | Horie | |
| 9,063,025 B2 | 6/2015 | Horie | |
| 2007/0227785 A1* | 10/2007 | Katsurahira | G06F 3/046 178/18.07 |
| 2012/0256830 A1* | 10/2012 | Oda | G06F 3/03545 345/157 |
| 2012/0306824 A1* | 12/2012 | Horie | G06F 3/03545 345/179 |
| 2014/0009863 A1* | 1/2014 | Obata | G01D 5/2417 361/294 |
| 2015/0130772 A1 | 5/2015 | Katsurahira | |
| 2015/0160782 A1* | 6/2015 | Park | G06F 3/044 345/174 |
| 2016/0018912 A1 | 1/2016 | Kaneda et al. | |

FOREIGN PATENT DOCUMENTS

| | | |
|---|---|---|
| JP | 7-295722 A | 11/1995 |
| JP | 2009-86925 A | 4/2009 |
| JP | 2011-186803 A | 9/2011 |
| JP | 2012-252660 A | 12/2012 |
| JP | 2013-161307 A | 8/2013 |
| JP | 2014-119936 A | 6/2014 |
| JP | 2015-26359 A | 2/2015 |

* cited by examiner

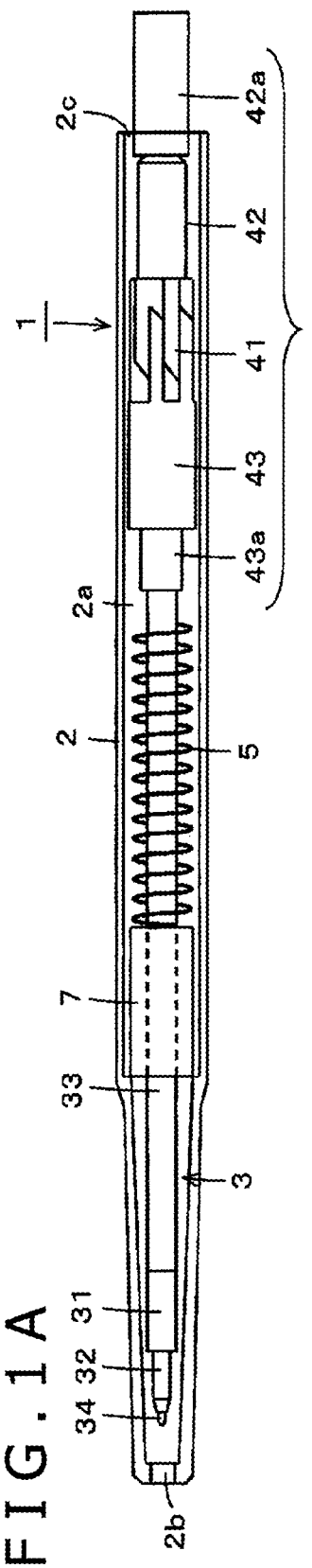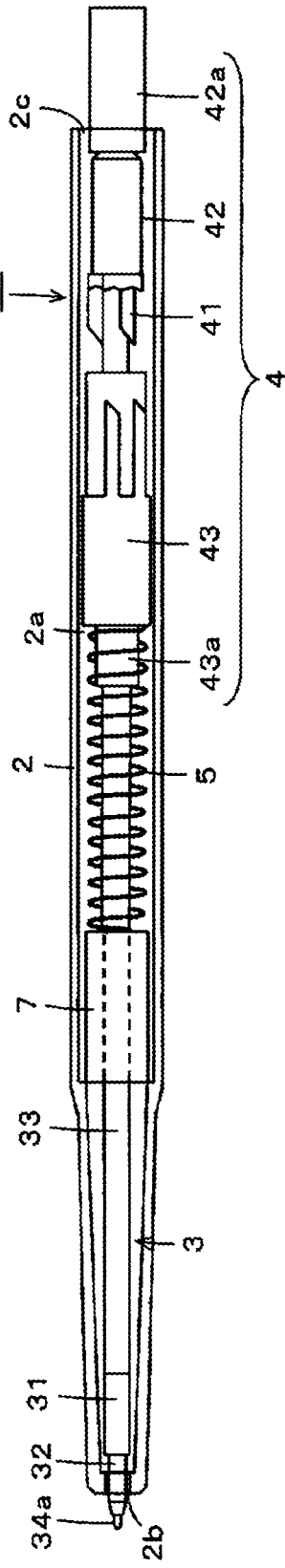

ELECTRONIC PEN AND ELECTRONIC PEN MAIN BODY

BACKGROUND

Technical Field

This disclosure relates to an electronic pen used with a position detecting device and an electronic pen main body used for this electronic pen.

Description of Related Art

In recent years, a coordinate input device has come to be used as an input device of various pieces of electronic equipment and opportunities for use of an electronic pen as an input tool of this coordinate input device have been increasing. As the coordinate input device, conventionally the electromagnetic induction system is mainly used. As one of this electromagnetic induction system, there is a system in which a magnetic field from a sensor is received by a resonant circuit included in an electronic pen and return to the sensor is made (for example, Patent Document 1 (refer to Japanese Patent Laid-open No. 2009-86925)).

The coordinate input device of this electromagnetic induction system is composed of a position detecting device including a sensor obtained by disposing a large number of loop coils in the X-axis direction and the Y-axis direction of coordinate axes and an electronic pen as a pen-shaped position indicator having a resonant circuit composed of a coil as an example of an inductance element wound around a magnetic core and a capacitor.

The position detecting device supplies a transmission signal having a predetermined frequency to the loop coils of the sensor and transmits the signal to the electronic pen as electromagnetic energy. The resonant circuit of the electronic pen is configured to have a resonance frequency according to the frequency of the transmission signal and stores the electromagnetic energy based on the electromagnetic induction effect between the resonant circuit and the loop coils of the sensor. Then, the electronic pen returns the electromagnetic energy stored in the resonant circuit to the loop coils of the sensor of the position detecting device.

The loop coils of the sensor detect the electromagnetic energy from this electronic pen. The position detecting device detects the coordinate values of the X-axis direction and the Y-axis direction regarding the position on the sensor indicated by the electronic pen based on the position of the loop coil that has supplied the transmission signal and the position of the loop coil that has detected the electromagnetic energy from the resonant circuit of the electronic pen.

Furthermore, recently, a position detecting device of the capacitive coupling system that is so used as to be overlapped on the front surface side of a liquid crystal display (LCD) as an example of a display has also been used for a portable device. Furthermore, a transmission-type electronic pen has come to be used and prized as an electronic pen used with this position detecting device of the capacitive coupling system.

This kind of electronic pen for the position detecting device of the capacitive coupling system is a so-called active-system electronic pen that includes a battery and includes a signal transmitting circuit driven by a voltage from this battery and supplies a transmission signal from this signal transmitting circuit to a position detecting sensor as a signal for position detection (for example, refer to Patent Document 2 (Japanese Patent Laid-open No. 1995-295722) and so forth). As the battery, besides a primary battery, a secondary battery of a charge system is also used. Meanwhile, the position detecting system uses a sensor panel of position detecting means and carries out position detection as a position indicated by the position indicator from the signal intensity of individual conductors that have received the transmission signal from this active-system position indicator.

PRIOR ART DOCUMENTS

Patent Documents

Patent Document 1: Japanese Patent Laid-open No. 2009-86925
Patent Document 2: Japanese Patent Laid-open No. 1995-295722

BRIEF SUMMARY

Technical Problems

The above-described position detecting device of the electromagnetic induction system and the position detecting device of the capacitive coupling system each have advantages and disadvantages. For electronic equipment, either system is employed according to the use purpose, use environment, and so forth thereof. For this reason, either one system does not occupy the majority. Not only pieces of electronic equipment that employ the position detecting device of the electromagnetic induction system but also a large number of pieces of electronic equipment that employ the position detecting device of the capacitive coupling system exist.

Conventionally, the user must prepare electronic pens compatible with each of the electromagnetic induction system and the capacitive coupling system employed for the position detecting device of electronic equipment. Thus, while checking the system employed for the electronic equipment, the user needs to use the electronic pen according to the checked system, which is troublesome. Furthermore, if the electronic pen for one system is lost, the electronic equipment to which this system corresponds becomes incapable of input by use of the position detecting device unless an electronic pen of the same system is newly purchased, which is inconvenient.

Furthermore, also for the manufacturing company, because the electronic pens for each of both systems of the electromagnetic induction system and the capacitive coupling system must be each manufactured and prepared, there is a problem that a wide variety of parts are necessary and the parts cost, the manufacturing cost, and the selling cost are high.

This disclosure provides an electronic pen that can solve one or more of the above problems.

Technical Solutions

In order to solve the above-described problems, claim 1 provides an electronic pen including a magnetic core that has a through-hole and around which a coil is wound in a direction along the through-hole, a core body that is inserted in the through-hole of the magnetic core and has electrical conductivity, a capacitor that forms a resonant circuit with the coil, a signal generation circuit that generates a signal that enables a position of the electronic pen to be detected, the signal being transmitted through the core body, an electricity storage device, and a charge circuit which, in operation, charges the electricity storage device by an induced current generated in the coil according to an external magnetic field, wherein, while the resonant circuit operates, the signal generated by the signal generation circuit is concurrently transmitted through the core body.

As described in claim 2, in a state in which the electronic pen according to claim 1 with the above-described configuration is used with a sensor of an electromagnetic induction system, the electronic pen, in operation, receives electromagnetic energy from the sensor and returns the received electromagnetic energy to the sensor by the resonant circuit and charges the electricity storage device by the induced current generated in the coil.

Furthermore, as described in claim 3, in a state in which the electronic pen according to claim 1 with the above-described configuration is used with a sensor of a capacitive coupling system, the electronic pen, in operation, transmits the signal generated by the signal generation circuit to the sensor through the core body and charges the electricity storage device by the induced current generated in the coil.

According to the electronic pen of this disclosure with the above-described configuration, the electronic pen can be used as an electronic pen for both systems of a position detecting device of the electromagnetic induction system and a position detecting device of the capacitive coupling system. In addition, according to the electronic pen of this disclosure, there is an advantage that the electronic pen can be used as an electronic pen for position detecting devices of the respective systems without any switching operation between the electromagnetic induction system and the capacitive coupling system.

Advantageous Effects

According to this disclosure, an electronic pen compatible with both of a position detecting device of the electromagnetic induction system and a position detecting device of the capacitive coupling system can be provided. In addition, according to the electronic pen of this disclosure, the electronic pen can be used as an electronic pen for position detecting devices of the respective systems without any switching operation between the electromagnetic induction system and the capacitive coupling system.

BRIEF DESCRIPTION OF THE DRAWINGS

FIGS. 1A and 1B are diagrams illustrating a configuration example of a first embodiment of an electronic pen according to this disclosure.

MODES FOR CARRYING OUT THE DISCLOSURE

Figure 2A:
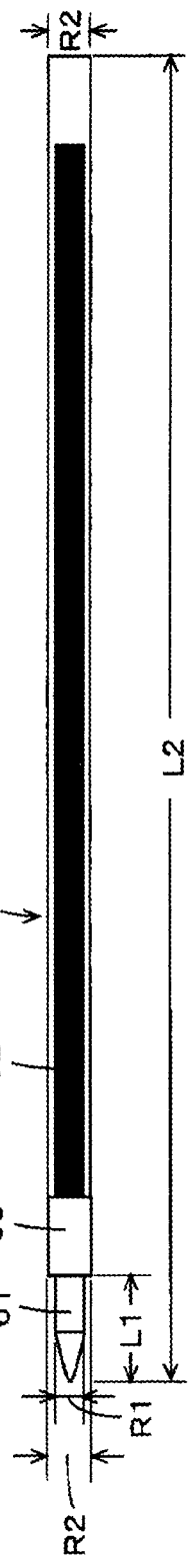
FIGS. 2A and 2B are diagrams for explaining a configuration example of an electronic pen main body used in the first embodiment of the electronic pen according to this disclosure.

Embodiments of the electronic pen and the electronic pen main body according to this disclosure will be described below with reference to the drawings.

First Embodiment

FIGS. 1A and 1B are diagrams illustrating a configuration example of a first embodiment of an electronic pen according to this disclosure. An electronic pen 1 of this first embodiment has a knock-type configuration in which an electronic pen main body 3 is housed in a hollow part 2a of a tubular chassis 2 and the pen tip side of the electronic pen main body 3 is protruded and retracted from the side of an opening 2b at one end of the chassis 2 in the longitudinal direction by a knock cam mechanism 4. In this embodiment, the electronic pen main body 3 is provided with a cartridge-type configuration and is enabled to be attached and detached to and from the chassis 2.

FIG. 1A illustrates a state in which the entire electronic pen main body 3 is housed in the hollow part 2a of the chassis 2. FIG. 1B illustrates a state in which the pen tip side of the electronic pen main body 3 protrudes from the opening 2b of the chassis 2 by the knock cam mechanism 4. The example of FIGS. 1A and 1B is illustrated as the state in which the chassis 2 of the electronic pen 1 is composed of a transparent synthetic resin and the inside thereof is see-through.

The electronic pen 1 of this embodiment is configured to ensure compatibility with a commercially-available knock-type ballpoint pen.

The chassis 2 and the knock cam mechanism 4 provided in this chassis 2 have the same configuration as a well-known commercially-available knock-type ballpoint pen and the dimensional relationship is also configured identically. In other words, it is also possible to use the chassis and the knock cam mechanism of the commercially-available knock-type ballpoint pen as they are as the chassis 2 and the knock cam mechanism 4.

As illustrated in FIG. 1, the knock cam mechanism 4 has a well-known configuration in which a cam main body 41, a knock bar 42, and a rotary element 43 are combined. The cam main body 41 is formed on the inner wall surface of the tubular chassis 2. An end part 42a of the knock bar 42 is made to protrude from an opening 2c on the side opposite to the pen tip side of the chassis 2 so that knock operation by a user can be accepted. The rotary element 43 has a fitting part 43a to which the end part of the electronic pen main body 3 on the side opposite to the pen tip side is fitted.

When the end part 42a of the knock bar 42 is pressed down in the state of FIG. 1(A), the electronic pen main body 3 is locked into the state of FIG. 1B in the chassis 2 by the knock cam mechanism 4, which provides the state in which the pen tip side of the electronic pen main body 3 protrudes from the opening 2b of the chassis 2. Then, when the end part 42a of the knock bar 42 is pressed down again from this state of FIG. 1(B), the locked state is released by the knock cam mechanism 4 and the position of the electronic pen main body 3 in the chassis 2 returns to the state of FIG. 1A by a return spring 5. The return spring 5 is provided between the knock cam mechanism 4 and a spring receiving member 7. The spring receiving member 7 is attached to be fixed at a predetermined position in the axial center direction in the hollow part of the chassis 2, and a through-hole in which the electronic pen main body 3 is inserted is formed therein. The detailed configuration of the knock cam mechanism 4 of the electronic pen main body 3 and the operation thereof are well known and therefore description thereof is omitted here.

Embodiment of Electronic Pen Main Body 3

Figure 2B:
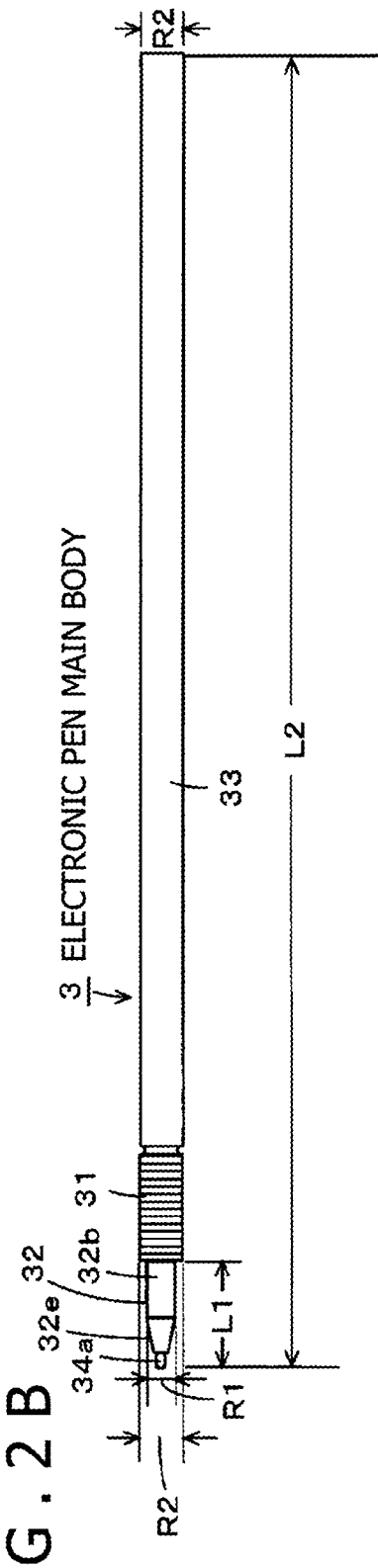

FIGS. 2A and 2B are diagrams illustrating a configuration example of the electronic pen main body 3 with comparison with a refill of a commercially-available knock-type ballpoint pen. Specifically, FIG. 2A illustrates a refill 6 of the commercially-available knock-type ballpoint pen and FIG. 2B illustrates a configuration example of the electronic pen main body 3 of this embodiment.

As illustrated in FIG. 2A, the refill 6 of the commercially-available knock-type ballpoint pen has a well-known configuration in which a pen tip part 61 in which a ball is disposed at the tip and an ink storage 62 are joined at a joint part 63 and are integrated. The joint part 63 has the same diameter as the ink storage 62.

On the other hand, in the electronic pen main body 3 of this embodiment, a magnetic core, a ferrite core 32 in this example, around which a coil 31 is wound is joined to a tubular body 33 as illustrated in FIG. 2B. Furthermore, a core body 34 is inserted through a through-hole (diagrammatic representation is omitted in FIGS. 2 A and 2B) of the ferrite core 32 and, as described later, is fitted to a writing pressure detection circuit (diagrammatic representation is omitted in FIGS. 2A and 2B) provided in the tubular body 33 and is provided as part of the electronic pen main body 3. As illustrated in FIGS. 2A and 2B, in the core body 34, one end part 34a (hereinafter, referred to as tip part 34a) protrudes from the ferrite core 32 as the pen tip.

Figure 3A:
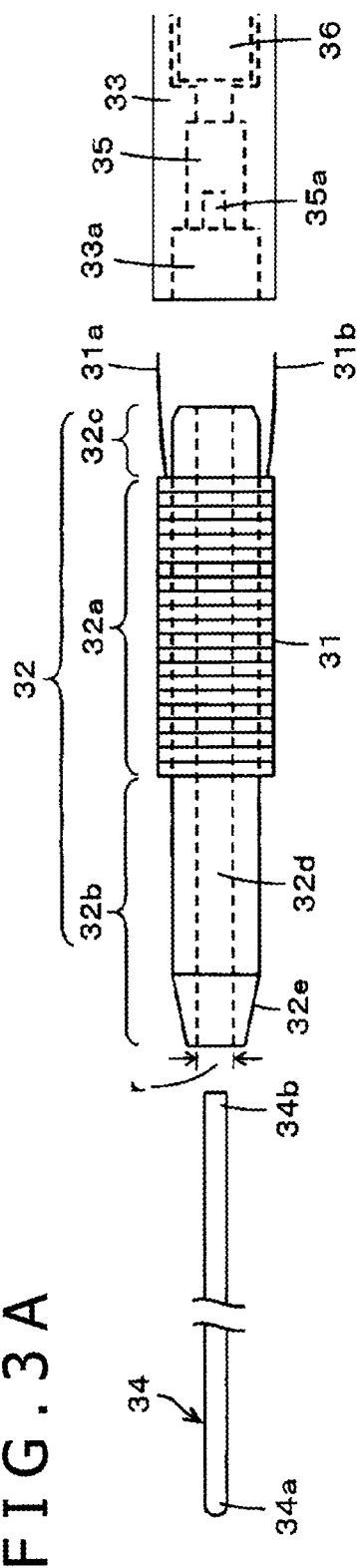
FIGS. 3A and 3B are diagrams for explaining a configuration example of part of the electronic pen main body used in the first embodiment of the electronic pen according to this disclosure.

FIG. 3A is an enlarged exploded view of the ferrite core 32 around which the coil 31 is wound, part of the tubular body 33, and the part of the core body 34. The ferrite core 32 in this example is obtained by forming a through-hole 32d in the axial center direction with a predetermined diameter r (for example, r=1 mm), for insertion of the core body 34 in a ferrite material having a circular column shape, for example. On the pen tip side of this ferrite core 32, a taper part 32e that gradually tapers is formed. Due to this taper part 32e, magnetic flux that passes through this ferrite core 32 becomes high density at the taper part 32e and magnetic coupling with the sensor of the position detecting device can be made stronger compared with the case in which the taper part 32e does not exist.

Furthermore, in this embodiment, as illustrated in FIG. 3A, the coil 31 is not wound over the total length of the ferrite core 32 in the axial center direction but partly wound. Specifically, in this example, the coil 31 is set to have a winding length that is approximately half length of the total length of the ferrite core 32. In addition, as illustrated in FIG. 3A, a wound part 32a of this coil in the ferrite core 32 is set at a position biased toward the side of the joint part to the tubular body 33 in the ferrite core 32.

Furthermore, when the ferrite core 32 is seen in its axial center direction, the part from the end part on the pen tip side to one end of the coil-wound part 32a is set as a first coil-non-wound part 32b around which the coil is not wound. Moreover, a slight part from the other end of the coil-wound part 32a to the side of the joint part to the tubular body 33 in the ferrite core 32 is also set as a second coil-non-wound part 32c around which the coil 31 is not wound. The length of the second coil-non-wound part 32c in the axial center direction is set to a short length for the joining to the tubular body 33. On the other hand, in this example, the length of the first coil-non-wound part 32b in the axial center direction is set to a comparatively-long length obtained by subtracting the length of the second coil-non-wound part 32c from approximately half length of the total length of the ferrite core 32.

Moreover, in this embodiment, a writing pressure detection circuit 35 is provided near the joint part to the ferrite core 32 in the tubular body 33. In this example, this writing pressure detection circuit 35 is provided with a configuration of a variable-capacitance capacitor whose capacitance changes according to the writing pressure, using writing pressure detecting means with a well-known configuration described in Patent Document: Japanese Patent Laid-open No. 2011-186803, for example. It is also possible for the writing pressure detection circuit 35 to have a configuration using a semiconductor element that enables the capacitance to vary according to the writing pressure like that disclosed in Japanese Patent Laid-open No. 2013-161307, for example.

A printed circuit board 36 is further housed in the tubular body 33. This printed circuit board 36 is provided with an oscillation circuit 37 that forms an example of the signal generation circuit and a signal processing circuit (see FIG. 4) including a resonant circuit composed of the coil 31 and capacitors connected in parallel thereto (capacitor to be described later and the variable-capacitance capacitor formed of the writing pressure detection circuit 35) as described later.

Figure 3B:
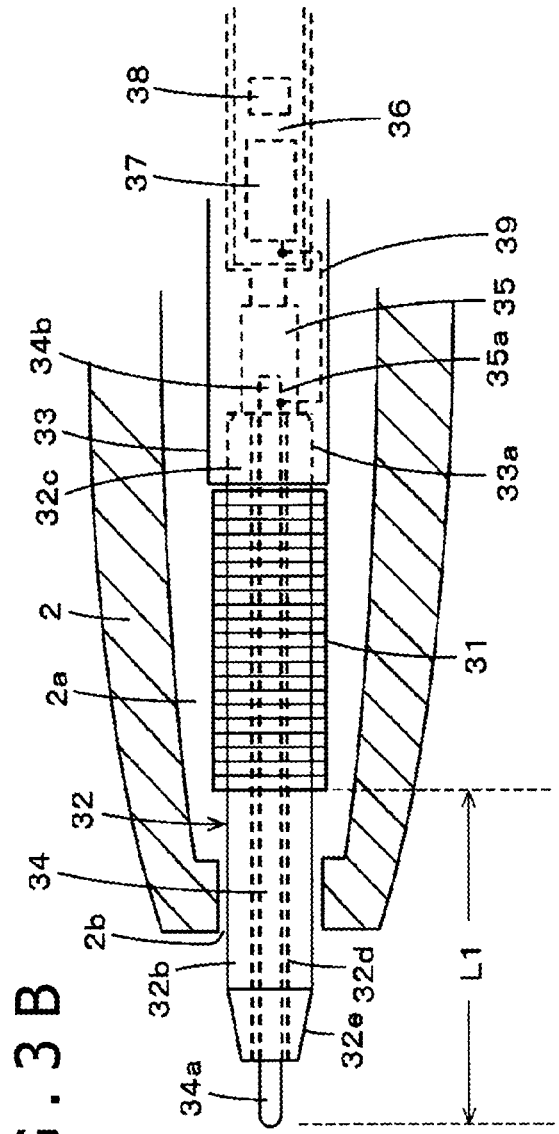

Furthermore, as illustrated in FIG. 3B, all or part of the second coil-non-wound part 32c of the ferrite core 32 is fitted to a concave part 33a made in the tubular body 33 and thereby the ferrite core 32 is joined to the tubular body 33. Although diagrammatic representation is omitted, in this joining of the ferrite core 32 to the tubular body 33, ends 31a and 31b of the coil 31 are electrically connected to a capacitor 38 provided on the printed circuit board 36 in the tubular body 33 so as to be connected in parallel to the capacitor 38.

As illustrated in FIG. 3A, the core body 34 is formed of a bar-shaped member that has a diameter smaller than the diameter r of the through-hole of the ferrite core 32 and has electrical conductivity. In this example, the core body 34 is provided with a configuration of an electrode core composed of a hard resin in which a conductor, e.g. an electrically-conductive metal or electrically-conductive powders, is mixed. The core body 34 that forms this electrode core is connected to the signal output terminal of the oscillation circuit 37 that forms the signal transmitting circuit of the printed circuit board 36 by a connecting line 39.

In the state in which the ferrite core 32 and the tubular body 33 are joined, this core body 34 is inserted in the through-hole 32d of the ferrite core 32 from the side on which the taper part 32e is formed as illustrated in FIG. 3B. Furthermore, in the core body 34, an end part 34b on the side opposite to the tip part 34a thereof is fitted to a fitting part 35a of the writing pressure detection circuit 35 in the tubular body 33. In this case, although detailed diagrammatic representation is omitted, e.g. an elastic material such as elastic rubber is disposed at the fitting part 35a of the writing pressure detection circuit 35 and the end part 34b of the core body 34 is held by this elastic material. This prevents the core body 34 from easily dropping off. However, when a user applies a force to withdraw the core body 34, the fitting between the core body 34 and the fitting part 35a of the writing pressure detection circuit 35 is easily released and the core body 34 can be withdrawn. That is, the core body 34 is made replaceable.

In the case of this example, as illustrated in FIG. 2A and FIG. 2B, the configuration is so made that the dimensions of the pen tip side of the electronic pen main body 3 are almost equal to the dimensions of the pen tip side of the refill 6 of the ballpoint pen. Specifically, the configuration is so made that the diameter of the ferrite core 32 provided on the pen tip side of the electronic pen main body 3 is almost equal to diameter R1 of the pen tip part 61 of the refill 6 of the ballpoint pen. Furthermore, the configuration is so made that the total length of the length of the part protruding from the ferrite core 32 in the tip part 34a of the core body 34 and the length of the first coil-non-wound part 32b of the ferrite core 32 is almost equal to length L1 of the pen tip part 61 of the refill 6 of the ballpoint pen as illustrated in FIGS. 2A and 2B and FIG. 3B.

Furthermore, the diameter of the coil-wound part 32a, around which the coil 31 is wound, of the ferrite core 32 and the diameter of the tubular body 33 in the electronic pen main body 3 are almost equal to diameter R2 of the ink storage 62 of the refill 6 of the ballpoint pen and are larger than the diameter R1 of the above-described pen tip part 61 (R2>R1). The diameter of the opening 2b of the chassis 2 is smaller than this diameter R2. Therefore, the coil-wound part 32a cannot protrude from the opening 2b to outside of the chassis 2.

Furthermore, as illustrated in FIGS. 2A and 2(B), the length (total length) of the electronic pen main body in the state in which the ferrite core 32 and the tubular body 33 are joined and the core body 34 is fitted to the writing pressure detection circuit 35 in the tubular body 33 through the through-hole of the ferrite core 32 is selected to be equal to total length L2 of the refill 6 of the ballpoint pen.

The electronic pen main body 3 with the above configuration can be housed in the chassis 2 by causing the electronic pen main body 3 to be inserted in the through-hole of the spring receiving member 7 and then fitting the tubular body 33 thereof to the fitting part 43a of the rotary element 43 of the knock cam mechanism 4.

Moreover, in the electronic pen 1 of this embodiment, a user presses down the end part 42a of the knock bar 42 when using the electronic pen 1 with a position detecting device. Thereupon, in the electronic pen 1, as illustrated in FIG. 1B and FIG. 3B, the state is obtained in which the tip part 34a of the core body 34 and part of the first coil-non-wound part 32b of the ferrite core 32 protrude from the opening 2b of the chassis 2. In this state, the user of the electronic pen 1 carries out input operation of an indicated position over the sensor of the position detecting device.

When the use of the electronic pen 1 ends, the user presses down the end part 42a of the knock bar 42 again. Thereby, as illustrated in FIG. 1A, the entire electronic pen main body 3 can be set to the state of being housed in the hollow part 2a of the chassis 2. At this time, the entire electronic pen main body 3 is housed in the hollow part 2a of the chassis 2 and the tip part 34a of the core body 34 of the electronic pen main body 3 becomes the state of being protected by the chassis 2.

Figure 4:
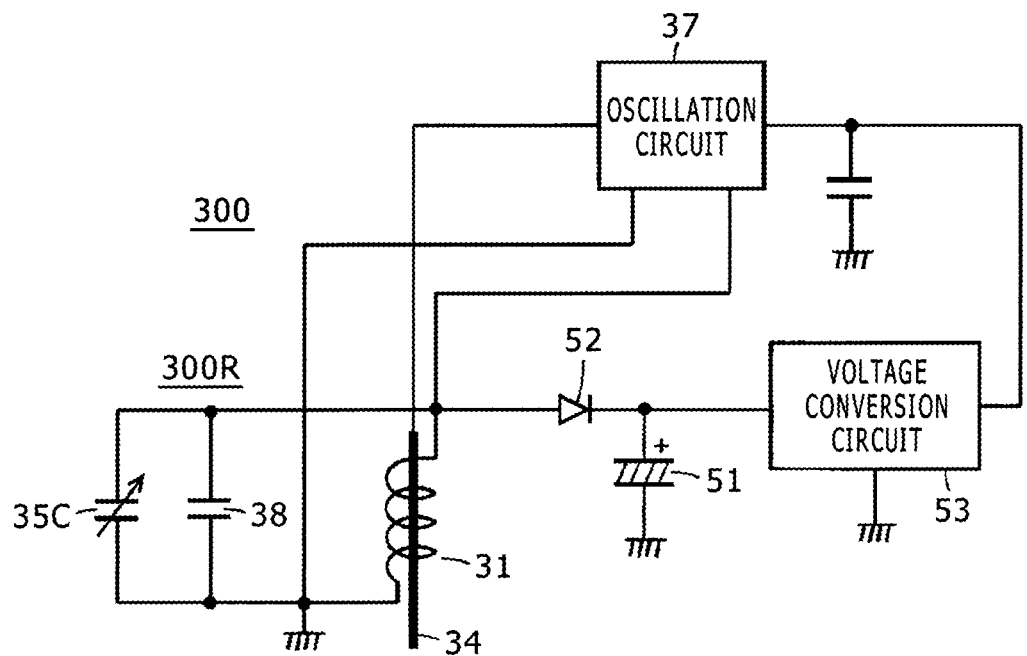
FIG. 4 is a diagram illustrating a configuration example of a signal processing circuit in the first embodiment of the electronic pen according to this disclosure.

Next, a configuration example of the signal processing circuit of the electronic pen 1 of this first embodiment will be described. FIG. 4 is a diagram illustrating a circuit configuration example of a signal processing circuit 300 of the electronic pen 1.

As illustrated in this FIG. 4, the capacitor 38 (see FIG. 3B) provided on the printed circuit board 36 and a variable-capacitance capacitor 35C formed of the writing pressure detection circuit 35 are connected in parallel to the coil 31, so that a resonant circuit 300R is formed. Therefore, the resonance frequency of the resonant circuit 300R is set to a frequency according to the writing pressure detected in the writing pressure detection circuit 35.

Furthermore, in the electronic pen of this embodiment, this resonant circuit 300R is connected to the oscillation circuit 37 as a circuit part that decides the oscillation frequency of the oscillation circuit 37 formed on this printed circuit board 36.

Moreover, in FIG. 4, 51 is an electric double-layer capacitor that forms an example of the electricity storage device, 52 is a rectification diode, and 53 is a voltage conversion circuit. In this example, one end of the coil 31 is connected to the anode of the rectification diode 52 and the other end is grounded (GND). Furthermore, one end of the electric double-layer capacitor 51 is connected to the cathode of the rectification diode 52 and the other end is grounded. When an alternating magnetic field exists outside the electronic pen 1, an induced current is generated in the coil 31 and the induced current is supplied to the electric double-layer capacitor 51 through the rectification diode 52 as a charging current, so that the electric double-layer capacitor 51 is charged and electricity is stored therein.

The core body 34 penetrates through the through-hole 32d of the ferrite core 32, around which the coil 31 is wound, and is physically joined to (engaged with) the writing pressure detection circuit 35. In addition, for example, the core body 34 is electrically connected to the connecting line 39 (see a dotted line in FIG. 3B) at the above-described joint part between the electrically-conductive core body 34 and the writing pressure detection circuit 35. Furthermore, as described above, the connecting line 39 electrically connects the electrically-conductive core body 34 and the oscillation circuit 37. Therefore, in the electronic pen 1 of this embodiment, a configuration is made in which a pressure (writing pressure) applied to the core body 34 is transmitted to the writing pressure detection circuit 35 by the above-described physical joint between the core body 34 and the writing pressure detection circuit 35, which forms the variable-capacitance capacitor 35C, and a transmission signal from the oscillation circuit 37 is transmitted from the core body 34 via the connecting line 39.

As described above, the resonant circuit 300R has a resonance frequency according to the capacitance of the variable-capacitance capacitor of the writing pressure detection circuit 35, which changes according to the writing pressure applied to the core body 34. Furthermore, the oscillation circuit 37 generates a signal whose frequency changes according to the resonance frequency of the resonant circuit 300R and supplies the generated signal to the core body 34. The signal from the oscillation circuit 37 is radiated from the core body 34 as an electric field based on the signal.

In this case, in the electronic pen 1, the coil 31 is at a fixed potential (in this example, ground potential (GND)) and therefore this coil 31 acts as a shield electrode provided around the core body 34. The fixed potential of the coil 31 is not limited to the ground potential. It may be a positive-side potential of the power supply or may be an intermediate potential between the positive-side potential of the power supply and the ground potential.

The voltage conversion circuit 53 converts the voltage stored in the electric double-layer capacitor 51 to a certain voltage and supplies the voltage as the power supply of the oscillation circuit 37. This voltage conversion circuit 53 may be one of a buck type with which the voltage after the conversion is lower than the voltage across the electric double-layer capacitor 51 or may be one of a boost type with which the voltage after the conversion is higher than the voltage across the electric double-layer capacitor 51. Furthermore, the voltage conversion circuit 53 may be one of a buck-boost type that operates as a buck circuit when the voltage across the electric double-layer capacitor 51 is higher than the above-described certain voltage and operates as a boost circuit when the voltage across the electric double-layer capacitor 51 is lower than the above-described certain voltage.

Figure 5:
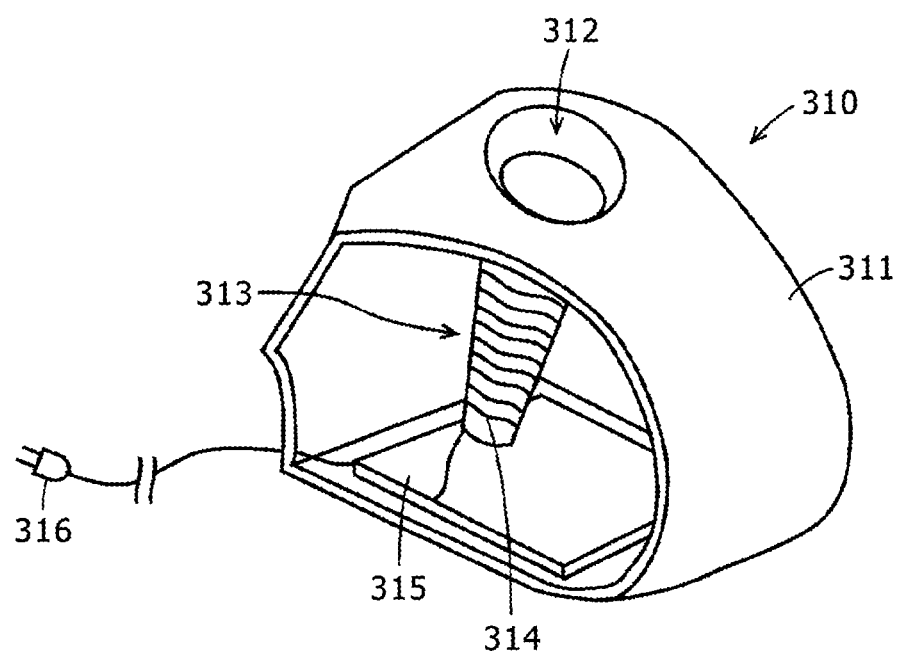
FIG. 5 is a diagram illustrating one example of a charger that charges the first embodiment of the electronic pen according to this disclosure.

FIG. 5 illustrates one example of a charger for the electronic pen 1 of this embodiment. A charger 310 of this example has an insertion port 312 for the electronic pen 1 at part of a chassis 311. In addition, the charger 310 includes a concave part that communicates with this insertion port 312 and has a support part 313 that supports the electronic pen 1 inserted in this concave part. A coil 314 for power supply is wound around the support part 313. The coil 314 for power supply is connected to a charge control circuit 315. A plug 316 that connects to an outlet of a commercial alternating current (AC) power supply is led out from the charge control circuit 315. In this example, the charge control circuit 315 drives the coil 314 for power supply to generate an alternating magnetic field with a frequency almost equal to the resonance frequency of the resonant circuit 300R.

When the electronic pen 1 of this embodiment is inserted in the concave part of the support part 313 from the insertion port 312 of this charger 310, an induced electromotive force is generated in the coil 31 of the electronic pen 1 by the alternating magnetic field generated by the charger 310 and charges the electric double-layer capacitor 51 through the rectification diode 52.

Circuit Configuration for Position Detection and Writing Pressure Detection in Position Detecting Device Used with Electronic Pen 1

Figure 6:
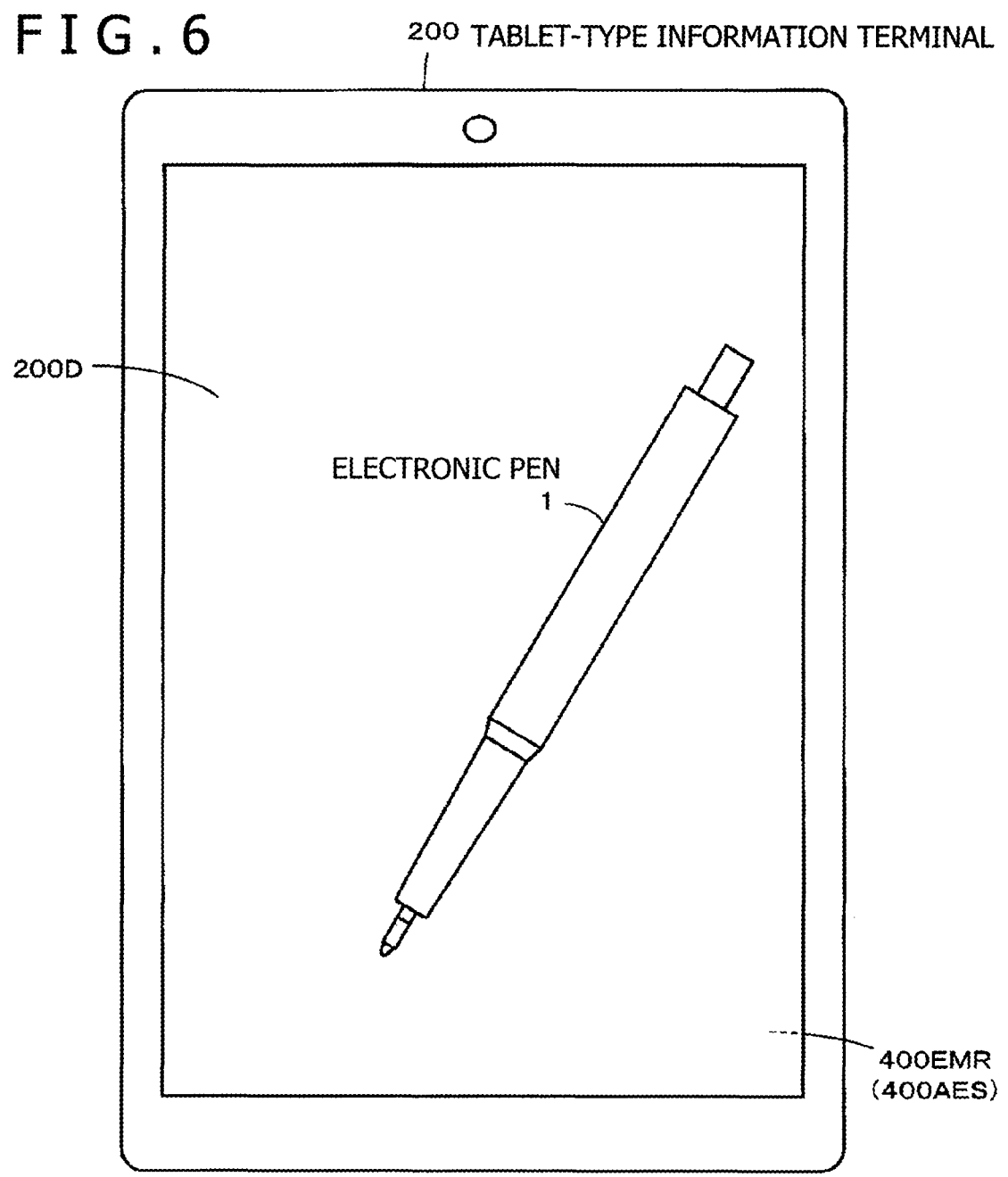
FIG. 6 is a diagram illustrating an example of electronic equipment in which the first embodiment of the electronic pen according to this disclosure is used.

FIG. 6 illustrates one example of a tablet-type information terminal 200 as an example of electronic equipment with which the electronic pen 1 of the embodiment of this disclosure is used as a position indicator. In this example, the tablet-type information terminal 200 includes a display screen 200D of a display device such as an LCD, for example. Furthermore, this kind of tablet-type information terminal 200 includes a position detecting device to which input can be carried out by using the position indicator. Moreover, as the position detecting device, terminals including a position detecting device 400EMR of the electromagnetic induction system and terminals including a position detecting device 400AES of the capacitive coupling system exist. The position detecting device 400EMR of the electromagnetic induction system is provided on the back side of the display device such as an LCD and the position detecting device 400AES of the capacitive coupling system is provided on the front side of the display device such as an LCD (upper side of the display screen).

As described at the beginning, conventionally, if the tablet-type information terminal includes the position detecting device 400EMR of the electromagnetic induction system, a dedicated electronic pen corresponding to this position detecting device 400EMR of the electromagnetic induction system needs to be used. Furthermore, if the tablet-type information terminal includes the position detecting device 400AES of the capacitive coupling system, a dedicated electronic pen corresponding to this position detecting device 400AES of the capacitive coupling system needs to be used. In contrast thereto, the electronic pen 1 of the embodiment with the above-described configuration can be used for either of the position detecting devices of both systems of the electromagnetic induction system and the capacitive coupling system with no switching operation or the like.

Figure 7:
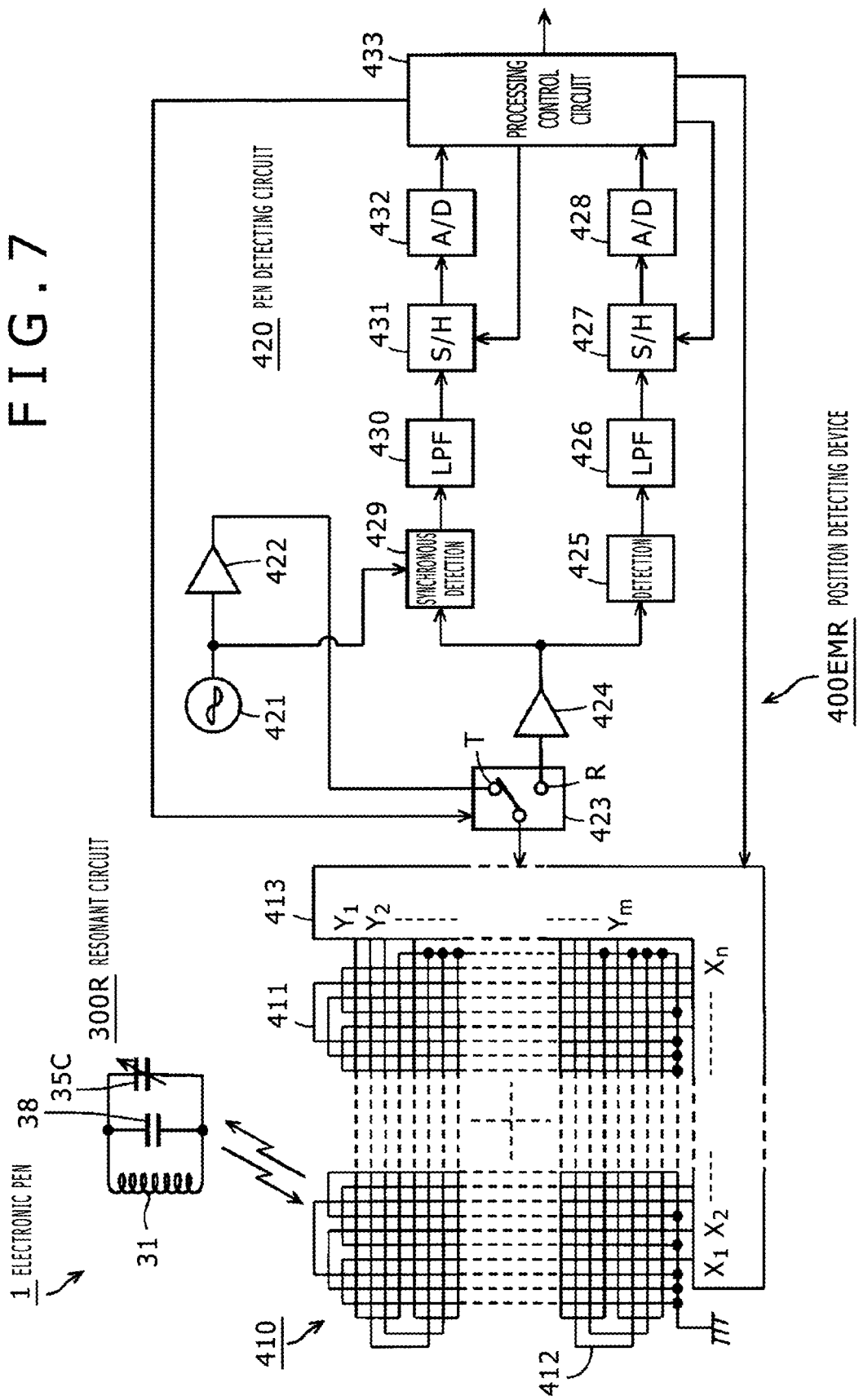
FIG. 7 is a diagram illustrating a configuration example of a position detecting device of the electromagnetic induction system used with the first embodiment of the electronic pen according to this disclosure.

Case in which Position Detecting Device 400EMR of Electromagnetic Induction System is Used FIG. 7 is a diagram illustrating a circuit configuration example of the position detecting device 400EMR of the electromagnetic induction system that carries out detection of the indicated position by the electronic pen 1 of the above-described embodiment and detection of the writing pressure applied to the electronic pen 1. As illustrated in FIG. 7, the position detecting device 400EMR of this example is composed of a position detecting sensor 410 and a pen detecting circuit 420 connected to this position detecting sensor 410.

In the electronic pen 1, only the resonant circuit 300R in the signal processing circuit 300 of FIG. 4 is electromagnetically coupled to the position detecting sensor 410 of the position detecting device 400EMR of the electromagnetic induction system as illustrated in this FIG. 7. Thereby, the electronic pen 1 carries out position indication and transmission of the writing pressure.

In this case, in this embodiment, the electric double-layer capacitor 51 is charged by the induced current that flows through the coil 31. Furthermore, the oscillation circuit 37 is also in an operating state due to the voltage from the voltage conversion circuit 53 and therefore a signal is sent out to the position detecting device 400EMR through the core body 34. However, in the position detecting device 400EMR, the signal of the electric field coupling can be almost ignored compared with the signal transmitted and received by electromagnetic coupling and thus does not have an adverse effect in position indication and detection of the writing pressure in the position detecting device 400EMR.

In the position detecting device 400EMR, the position detecting sensor 410 is formed by stacking an X-axis-direction loop coil group 411 and a Y-axis-direction loop coil group 412. The respective loop coil groups 411 and 412 are formed of e.g. n and m rectangular loop coils, respectively. The respective loop coils configuring the respective loop coil groups 411 and 412 are disposed to line up at equal intervals and sequentially overlap with each other.

Furthermore, in the position detecting device 400EMR, a selection circuit 413 to which the X-axis-direction loop coil group 411 and the Y-axis-direction loop coil group 412 are connected is provided. This selection circuit 413 sequentially selects one loop coil in the two loop coil groups 411 and 412.

Moreover, the pen detecting circuit 420 of the position detecting device 400EMR is provided with an oscillator 421, a current driver 422, a switching connection circuit 423, a receiving amplifier 424, a detector 425, a low-pass filter 426, a sample/hold circuit 427, an analog to digital (A/D) conversion circuit 428, a synchronous detector 429, a low-pass filter 430, a sample/hold circuit 431, an A/D conversion circuit 432, and a processing control 433. The processing control 433 is formed of a microcomputer.

The oscillator 421 generates an AC signal with a frequency f0. Furthermore, the oscillator 421 supplies the generated AC signal to the current driver 422 and the synchronous detector 429. The current driver 422 converts the AC signal supplied from the oscillator 421 to a current and sends out it to the switching connection circuit 423. The switching connection circuit 423 switches the connection target (transmission-side terminal T or reception-side terminal R) to which the loop coil selected by the selection circuit 413 is connected under control from the processing control 433. Of these connection targets, the transmission-side terminal T is connected to the current driver 422 and the reception-side terminal R is connected to the receiving amplifier 424.

An induced voltage generated in the loop coil selected by the selection circuit 413 is sent to the receiving amplifier 424 via the selection circuit 413 and the switching connection circuit 423. The receiving amplifier 424 amplifies the induced voltage supplied from the loop coil and sends out the amplified voltage to the detector 425 and the synchronous detector 429.

The detector 425 detects the induced voltage generated in the loop coil, i.e. the received signal, and sends out it to the low-pass filter 426. The low-pass filter 426 has a cutoff frequency sufficiently lower than the above-described frequency f0. The low-pass filter 426 converts the output signal of the detector 425 to a direct current (DC) signal and sends out it to the sample/hold circuit 427. The sample/hold circuit 427 holds a voltage value at predetermined timing of the output signal of the low-pass filter 426, specifically at predetermined timing in the reception period, and sends out it to the A/D conversion circuit 428. The A/D conversion circuit 428 converts the analog output of the sample/hold circuit 427 to a digital signal and outputs it to the processing control 433.

Meanwhile, the synchronous detector 429 carries out synchronous detection of the output signal of the receiving amplifier 424 with the AC signal from the oscillator 421 and sends out a signal at the level corresponding to the phase difference between them to the low-pass filter 430. This low-pass filter 430 has a cutoff frequency sufficiently lower than the frequency f0. The low-pass filter 430 converts the output signal of the synchronous detector 429 to a DC signal and sends out it to the sample/hold circuit 431. This sample/hold circuit 431 holds a voltage value at predetermined timing of the output signal of the low-pass filter 430 and sends out it to the A/D conversion circuit 432. The A/D conversion circuit 432 converts the analog output of the sample/hold circuit 431 to a digital signal and outputs it to the processing control 433.

The processing control 433 controls the respective circuits of the position detecting device 400EMR. Specifically, the processing control 433 controls selection of the loop coil in the selection circuit 413, switching of the switching connection circuit 423, and the timing of the sample/hold circuits 427 and 431. Based on the input signals from the A/D conversion circuits 428 and 432, the processing control 433 makes radio waves be transmitted from the X-axis-direction loop coil group 411 and the Y-axis-direction loop coil group 412 with a certain transmission continuation time (continuous transmission section).

An induced voltage is generated in the respective loop coils of the X-axis-direction loop coil group 411 and the Y-axis-direction loop coil group 412 by radio waves transmitted (returned) from the electronic pen 1. The processing control 433 calculates the coordinate values of the indicated position by the electronic pen 1 regarding the X-axis direction and the Y-axis direction based on the level of the voltage value of this induced voltage generated in the respective loop coils. Furthermore, the processing control 433 detects the writing pressure based on the level of the signal according to the phase difference between the transmitted radio waves and the received radio waves.

In this manner, the position detecting device 400EMR detects the position of the electronic pen 1 that has come close to the position detecting device 400EMR by the processing control 433. In addition, the position detecting device 400EMR obtains information on the writing pressure value of the electronic pen 1 by detecting the phase of the received signal.

Figure 8:
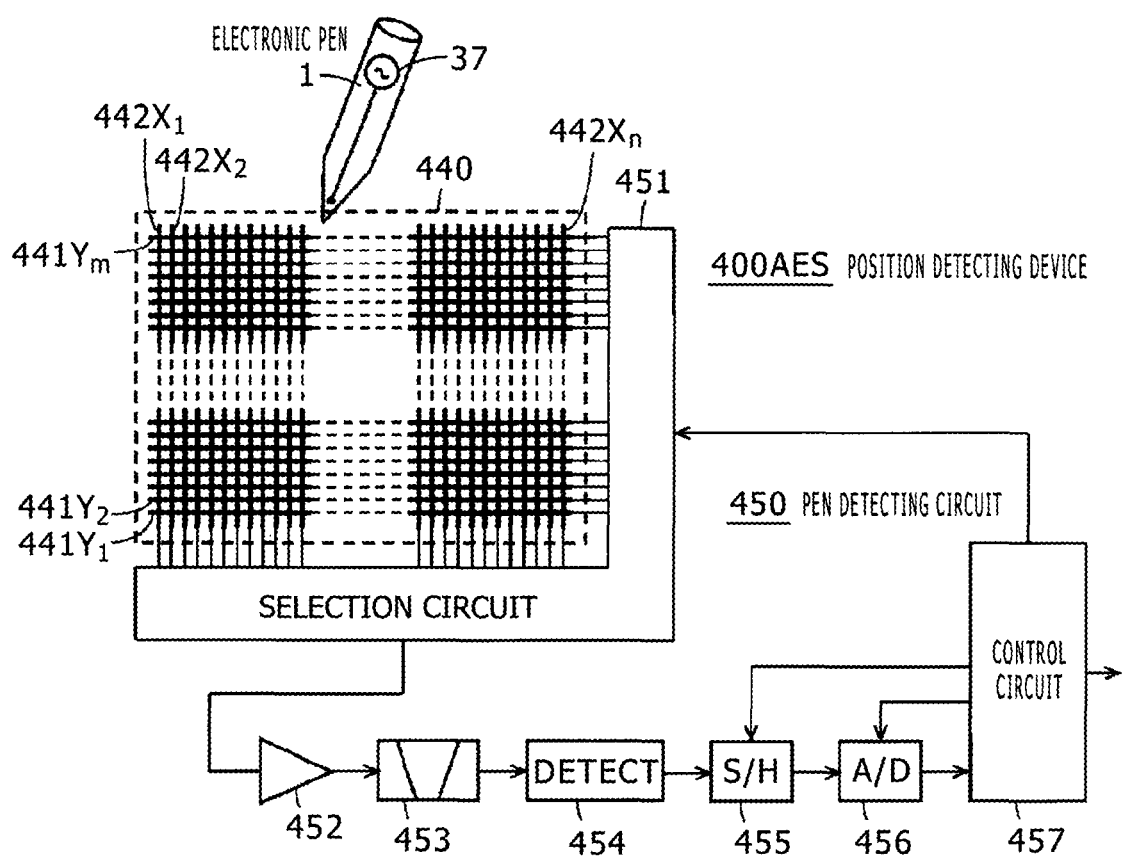
FIG. 8 is a diagram illustrating a configuration example of a position detecting device of the capacitive coupling system used with the first embodiment of the electronic pen according to this disclosure.

Case in which Position Detecting Device 400AES of Capacitive Coupling System is Used FIG. 8 is a diagram illustrating a circuit configuration example of the position detecting device 400AES of the capacitive coupling system that carries out detection of the indicated position by the electronic pen 1 of the above-described embodiment and detection of the writing pressure applied to the electronic pen 1.

As illustrated in FIG. 8, the position detecting device 400AES of this example is composed of a position detecting sensor 440 and a pen detecting circuit 450 connected to this position detecting sensor 440. In this example, the position detecting sensor 440 is a component formed by stacking a first conductor group 441, an insulating layer (diagrammatic representation is omitted), and a second conductor group 442 sequentially from the lower layer side although a sectional view is omitted. For example, the first conductor group 441 is a group obtained by disposing plural first conductors $441Y_1$, $441Y_2$, ..., and $441Y_m$, (m is an integer equal to or larger than 1) that extend along the horizontal direction (X-axis direction) in the Y-axis direction in parallel, with the plural first conductors $441Y_1$, $441Y_2$, ..., and $441Y_m$ separated from each other by predetermined intervals.

Furthermore, the second conductor group 442 is a group obtained by disposing plural second conductors $442X_1$, $442X_2, \ldots$, and $442X_n$ (n is an integer equal to or larger than 1) that extend along a direction intersecting the extension direction of the first conductors $441Y_1$, $441Y_2, \ldots$, and $441Y_m$, the vertical direction (Y-axis direction) orthogonal to the extension direction in this example, in the X-axis direction in parallel, with the plural second conductors $442X_1, 442X_2, \ldots$, and $442X_n$ separated from each other by predetermined intervals.

As above, the position detecting sensor 440 of the position detecting device 400AES has a configuration to detect a position indicated by the electronic pen 1 by using the sensor pattern formed by making the first conductor group 441 intersect the second conductor group 442.

In this case, in the electronic pen 1, a transmission signal from the oscillation circuit 37 in FIG. 4 is transmitted to the position detecting sensor 440 through the core body 34 having electrical conductivity. At this time, the resonant circuit 300R is also capable of operation. However, the position detecting sensor 440 of the position detecting device 400AES is not electromagnetically coupled to the resonant circuit 300R and thus detection of the indicated position and detection processing of the writing pressure by the electronic pen 1 are not affected.

In the following description, regarding the first conductors $441Y_1$, $441Y_2, \ldots$, and $441Y_m$, the conductor will be referred to as the first conductor 441Y when there is no need to discriminate the respective conductors. Similarly, regarding the second conductors $442X_1$, $442X_2, \ldots$, and $442X_n$, the conductor will be referred to as the second conductor 442X when there is no need to discriminate the respective conductors.

The pen detecting circuit 450 is composed of a selection circuit 451 used as an input/output interface with the position detecting sensor 440, an amplifying circuit 452, a band-pass filter 453, a detection circuit 454, a sample/hold circuit 455, an AD conversion circuit 456, and a control circuit 457.

The selection circuit 451 selects one conductor 441Y or 442X from the first conductor group 441 and the second conductor group 442 based on a control signal from the control circuit 457. The conductor selected by the selection circuit 451 is connected to the amplifying circuit 452 and a signal from the core body 34 of the electronic pen 1 is detected by the selected conductor and is amplified by the amplifying circuit 452. The output of this amplifying circuit 452 is supplied to the band-pass filter 453 and only a component of the frequency of the signal transmitted from the core body 34 of the electronic pen 1 is extracted.

An output signal of the band-pass filter 453 is subjected to detection by the detection circuit 454. An output signal of this detection circuit 454 is supplied to the sample/hold circuit 455 and is sampled and held at predetermined timing based on a sampling signal from the control circuit 457. Thereafter, the signal is converted to a digital value by the AD conversion circuit 456. The digital data from the AD conversion circuit 456 is read by the control circuit 457 and is processed.

The control circuit 457 operates to send out a control signal to each of the sample/hold circuit 455, the AD conversion circuit 456, and the selection circuit 451 based on a program stored in a read-only memory (ROM) inside the control circuit 457. Furthermore, the control circuit 457 calculates position coordinates on the position detecting sensor 440 indicated by the core body 34 of the electronic pen 1 from the digital data from the AD conversion circuit 456. In addition, the control circuit 457 detects the writing pressure detected in the writing pressure detection circuit 35.

Specifically, first, the control circuit 457 supplies a selection signal to sequentially select the second conductors $442X_1$ to $442X_n$ to the selection circuit 451, for example. Furthermore, when each of the second conductors $442X_1$ to $442X_n$ is selected, the control circuit 457 reads data output from the AD conversion circuit 456 as a signal level. Then, if the signal level of none of the second conductors $442X_1$ to $442X_n$ reaches a predetermined value, the control circuit 457 determines that the electronic pen 1 does not exist over the position detecting sensor 440, and repeats the control to sequentially select the second conductors $442X_1$ to $442X_n$.

If a signal at a level equal to or higher than the predetermined value is detected from any of the second conductors $442X_1$ to $442X_n$, the control circuit 450 stores the number of the second conductor 442X from which the highest signal level is detected and the numbers of plural second conductors 442X around it. Then, the control circuit 457 controls the selection circuit 451 to sequentially select the first conductors $441Y_1$ to $441Y_m$, and reads the signal level from the AD conversion circuit 456. At this time, the control circuit 457 stores the number of the first conductor 441Y from which the highest signal level is detected and the numbers of plural first conductors 441Y around it.

Then, the control circuit 457 detects a position on the position detecting sensor 440 indicated by the electronic pen 1 from the number of the second conductor 442X and the number of the first conductor 441Y from which the highest signal level is detected and the numbers of the plural second conductors 442X and the plural first conductors 441Y around them, stored in the above-described manner.

Furthermore, the control circuit 457 detects the frequency of the signal from the AD conversion circuit 456 and detects the writing pressure value detected in the writing pressure detection circuit 35 from the detected frequency. Specifically, as described above, the oscillation frequency of the oscillation circuit 37 of the electronic pen 1 is the frequency corresponding to the capacitance of the variable-capacitance capacitor formed of the writing pressure detection circuit 35. For example, the control circuit 457 has information on a correspondence table between the oscillation frequency of the oscillation circuit 37 of the electronic pen 1 and the writing pressure value and detects the writing pressure value from this information on the correspondence table.

In the example of the above description, the electronic pen 1 converts the writing pressure detected in the writing pressure detection circuit 35 to the frequency and supplies a signal with the frequency to the core body 34. However, the signal attribute to which the writing pressure is made to correspond is not limited to the frequency and the writing pressure may be made to correspond to the phase of the signal, the number of times of intermittence of the signal, or the like.

Another Example of Position Detecting Device of Capacitive Coupling System

With the position detecting device 400AES of the capacitive coupling system illustrated in FIG. 8, the resonant circuit 300R is in the operable state. However, an induced current is not generated in the coil 31 thereof and thus the electric double-layer capacitor 51 is not charged. Therefore, if the electronic pen 1 is used with the position detecting device 400AES of the capacitive coupling system over a long time, the voltage stored in the electric double-layer capacitor 51 is lowered. Thus, the use needs to be suspended and a charge needs to be carried out by using a charger, which is inconvenient.

Figure 9:
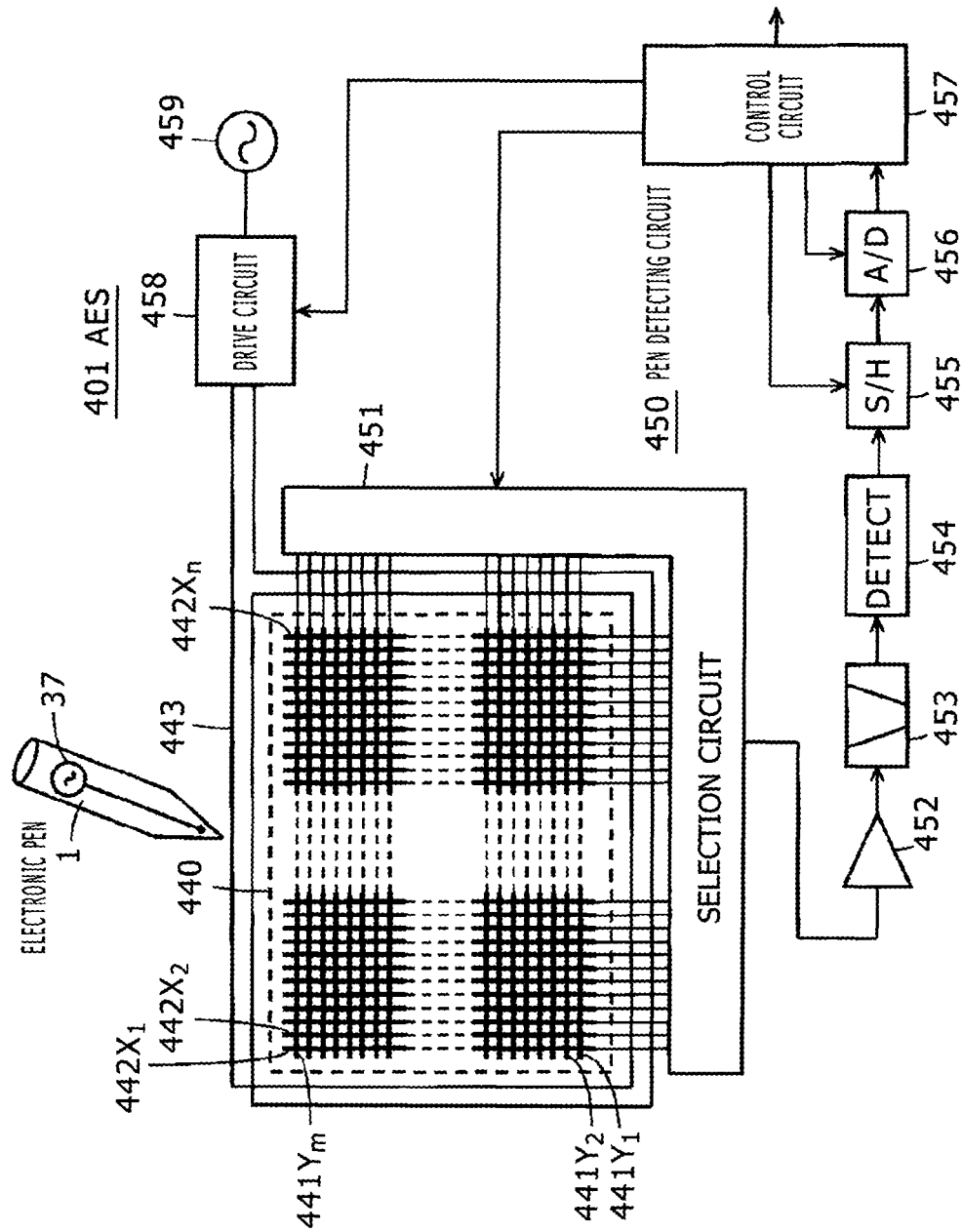
FIG. 9 is a diagram illustrating another configuration example of the position detecting device of the capacitive coupling system used with the first embodiment of the electronic pen according to this disclosure.

Another example of this position detecting device of the capacitive coupling system is an example of the case in which this point can be improved. Specifically, FIG. 9 is a diagram illustrating a configuration example of a position detecting device 401AES of the capacitive coupling system in this example. In this FIG. 9, the same parts as the above-described position detecting device 400AES of the capacitive coupling system are given the same reference symbols and description thereof is omitted.

In the position detecting device 401AES of the capacitive coupling system in this example of FIG. 9, an excitation coil 443 is disposed to surround the position detecting sensor 440. In FIG. 9, the excitation coil 443 has two turns. However, in practice, the excitation coil 443 is set to have a larger number of turns, e.g. eight to ten turns. As illustrated in FIG. 9, the excitation coil 443 is connected to a drive circuit 458 and the drive circuit 458 is connected to an oscillation circuit 459 that oscillates at the resonance frequency (center frequency) of the resonant circuit 300R, for example.

The drive circuit 458 is controlled by the processing control 457. In this example, when detecting reception of a signal from the electronic pen 1 based on the signal from the AD conversion circuit 456, the processing control 457 controls the drive circuit 458 and starts supply of an oscillation signal from the oscillation circuit 459 to the excitation coil 443 to supply electromagnetic energy from the excitation coil 443 to the electronic pen 1.

An induced current is generated in the coil 31 of the resonant circuit 300R of the electronic pen 1 due to an alternating magnetic field from this excitation coil 443. This induced current is supplied to the electric double-layer capacitor 51 through the rectification diode 52 as a charge current, so that the electric double-layer capacitor 51 is charged.

Therefore, if the position detecting device used with the electronic pen 1 is the position detecting device 401AES of the capacitive coupling system in FIG. 9, there is an effect that the electronic pen 1 can supply a signal from the oscillation circuit 37 to the position detecting sensor 440 of the position detecting device 401AES of the capacitive coupling system through the core body 34 while charging the electric double-layer capacitor 51 as an example of the electricity storage device.

Effects of Above-described First Embodiment

As described above, according to the electronic pen 1 of the above-described first embodiment, when this electronic pen 1 is brought above the position detecting sensor 410 of the position detecting device 400EMR of the electromagnetic induction system, this electronic pen 1 works as an electronic pen for a position detecting device of the electromagnetic induction system by the resonant circuit 300R. Furthermore, when the electronic pen 1 is brought above the position detecting sensor 440 of the position detecting device 400AES of the capacitive coupling system, this electronic pen 1 becomes the state in which a signal from the oscillation circuit 37 is sent out through the core body 34, and works as an electronic pen for a position detecting device of the capacitive coupling system. Moreover, in the electronic pen 1 of the above-described first embodiment, the user does not need to carry out any switching operation for both systems. Thus, the user can use the electronic pen 1 without being aware of which of the electromagnetic induction system and the capacitive coupling system the position detecting device is based on, which is very convenient.

Furthermore, according to the electronic pen 1 of the above-described first embodiment, the electronic pen 1 can be used with the position detecting device while charging the electric double-layer capacitor that forms the electricity storage device.

Moreover, according to the electronic pen 1 of the above-described first embodiment, information on the writing pressure detected in one writing pressure detection circuit 35 can be used as information for a position detecting device of the electromagnetic induction system and can also be used as information for a position detecting device of the capacitive coupling system. Specifically, in the above-described first embodiment, the writing pressure detection circuit 35 is configured as a capacitor that forms part of the resonant circuit 300R. In addition, this resonant circuit 300R is used also as the circuit for deciding the oscillation frequency of the oscillation circuit 37. Thus, to the position detecting device of the electromagnetic induction system, the information on the writing pressure can be transmitted as change information of the resonance frequency of the resonant circuit. Furthermore, to the position detecting device of the capacitive coupling system, the information on the writing pressure can be transmitted as change information of the frequency of the signal sent out through the core body 34.

Furthermore, according to the electronic pen 1 of the above-described first embodiment, when the electronic pen 1 is used as an electronic pen for a position detecting device of the capacitive coupling system, the coil 31 is set to a fixed potential and thus acts as a shield electrode for the electrically-conductive core body 34 that sends out a signal. Therefore, even when the chassis 2 of the electronic pen 1 is held with a hand, the signal output by the core body 34 is not affected.

Moreover, according to the electronic pen 1 of the above-described first embodiment, because of the configuration in which the coil 31 for a contactless charge is provided around the core body 34, a contactless charge by the charger 310 having a penholder shape is possible and an electronic pen with favorable operability can be implemented.

In addition, according to the above-described first embodiment, reduction in the thickness of the electronic pen main body 3 can be implemented. Thus, it becomes possible to enable the electronic pen main body 3 to have a configuration that enables ensuring of compatibility with a refill of a commercially-available ballpoint pen.

If the electronic pen main body 3 is provided with the configuration that enables ensuring of compatibility with a refill of a commercially-available ballpoint pen, there is a merit that the chassis of the commercially-available ballpoint pen can be diverted as the chassis 2 of the electronic pen 1. That is, the electronic pen 1 can be configured by housing the electronic pen main body 3 of this embodiment instead of a refill of the ballpoint pen in the chassis of the ballpoint pen.

Second Embodiment

A second embodiment is an improvement example of the electronic pen 1 of the first embodiment. In the above-described first embodiment, the configuration is made in which the electronic pen 1 is set to the state in which a signal is constantly supplied from the oscillation circuit 37 through the core body 34. For this reason, there is a problem that stored electrical power of the electric double-layer capacitor 51 is discharged if the electronic pen 1 is not mounted to a charger and not charged when being in an unused state. The second embodiment is an example in which this problem is solved. In the following description, the same parts as the electronic pen 1 of the above-described first embodiment are given the same reference symbols and detailed description thereof is omitted.

An electronic pen of this second embodiment is provided with detecting means that detects the time when the electronic pen 1 is in the unused state in which, as illustrated in FIG. 1A, the tip part 34a of the core body 34 does not protrude from the opening 2b of the chassis 2 and the entire electronic pen main body 3 is housed in the chassis 2 and a used state of the electronic pen 1 in which, as illustrated in FIG. 1B, the tip part 34a of the core body 34 is in a state of being protruded from the opening 2b of the chassis 2 due to a knock operation in the knock cam mechanism 4.

In an electronic pen main body 3A of the case of this second embodiment, a tubular body 33A is provided with a switch that is turned on and off according to movement in the axial center direction by the knock cam mechanism 4.

Figure 10:
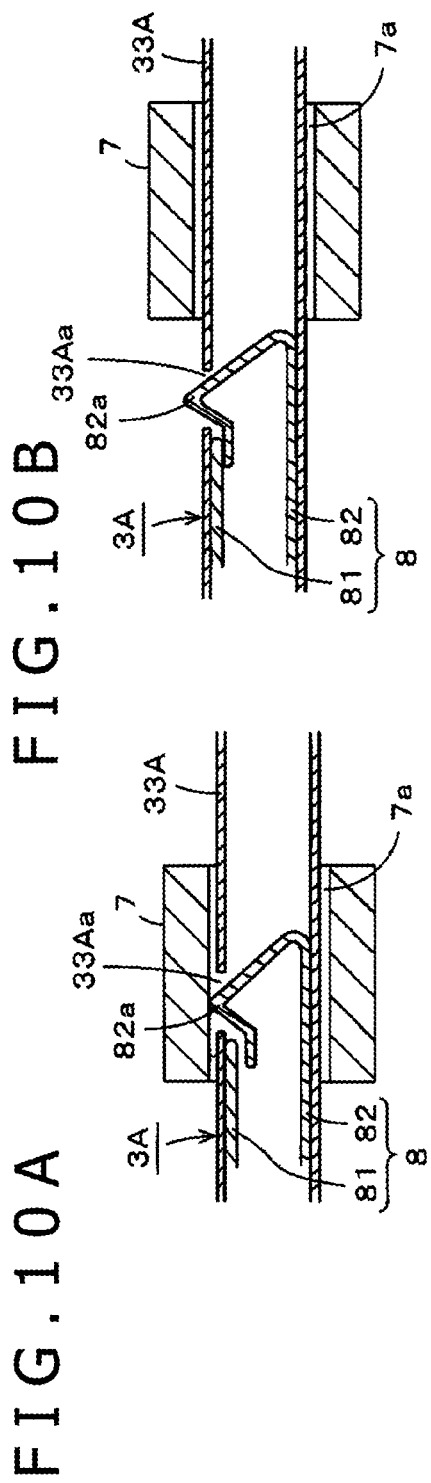
FIGS. 10A and 10B are diagrams for explaining aspects of a second embodiment of the electronic pen according to this disclosure.

FIGS. 10A and 10B are diagrams for explaining the switch provided in the electronic pen main body 3A. Specifically, in this example, a through-hole 33Aa is made in the circumferential surface of a predetermined part of the tubular body 33A of the electronic pen main body 3A as illustrated in FIGS. 10A and 10B. In addition, a switch 8 is provided in the tubular body 33A in such a manner as to be partly exposed from this through-hole 33Aa.

In this case, the predetermined part of the tubular body 33A in which the through-hole 33Aa is made is a part of the tubular body 33A housed in the through-hole 7a of the spring receiving member 7, which is provided to be fixed in the chassis 2, in the state in which the entire electronic pen main body 3A is housed in the chassis 2 of the electronic pen.

The switch 8 is composed of a material having elasticity and having electrical conductivity, e.g. an electrically-conductive metal having elasticity. As illustrated in FIGS. 10A and 10B, this switch 8 is composed of a fixed terminal piece 81 fixed to the inner wall surface near the through-hole 33Aa of the tubular body 33A and a movable terminal piece 82 that can be elastically in contact with this fixed terminal piece 81. The movable terminal piece 82 includes a bent part 82a configured to be capable of assuming the state of being elastically in contact with the fixed terminal piece 81 and the non-contact state, and is attached to the inside of the tubular body 33A in such a manner that part of this bent part 82a can protrude from the through-hole 33Aa.

When the electronic pen main body 3A is in the protected state in which the tip part 34a of the core body 34 does not protrude from the opening 2b of the chassis 2 and exists in the hollow part of the chassis 2, the switch 8 is located just in the through-hole 7a of the spring receiving member 7 as illustrated in FIG. 10A. Thus, the bent part 82a of the movable terminal piece 82 is elastically displaced to the inside of the tubular body 33A due to the inner wall of the through-hole 7a, which provides the state in which the fixed terminal piece 81 and the movable terminal piece 82 are not in contact with but separated from each other. That is, the switch 8 is in an off-state.

When the electronic pen main body 3A is in the used state of the electronic pen in which the tip part 34a of the core body 34 protrudes from the opening 2b of the chassis 2 due to the knock cam mechanism 4, the switch 8 becomes the state of being out of the through-hole 7a of the spring receiving member 7 as illustrated in FIG. 10B. Thereupon, part of the bent part 82a of the movable terminal piece 82 is elastically displaced to protrude from the through-hole 33Aa, which provides a state in which the movable terminal piece 82 and the fixed terminal piece 81 are in contact with each other. That is, the switch 8 is in an on-state.

Figure 11:
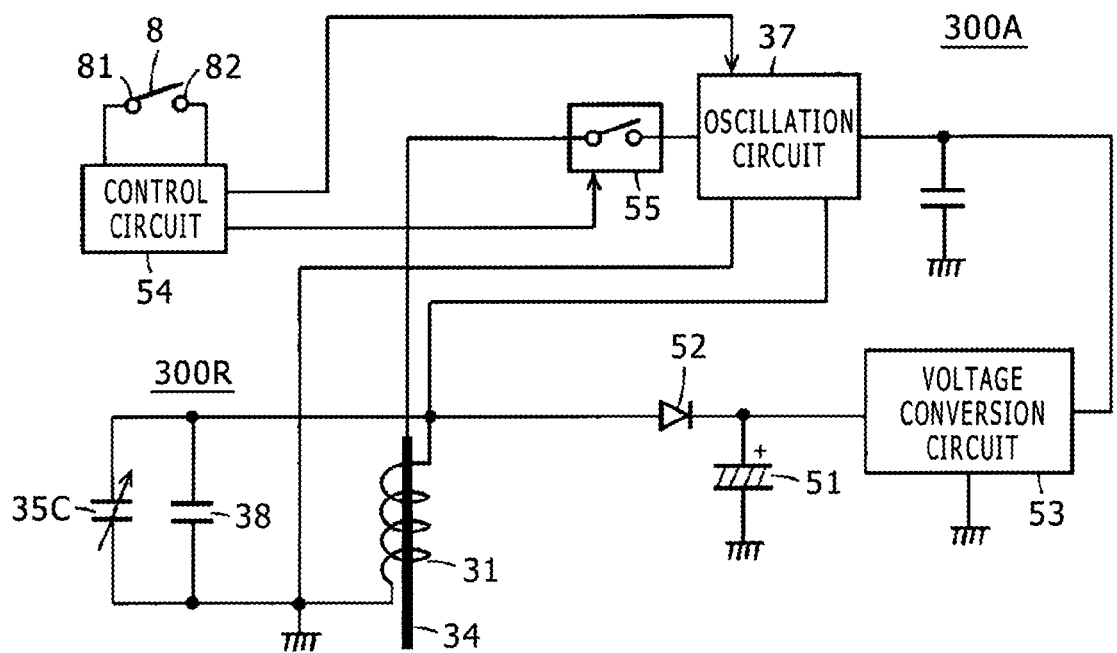
FIG. 11 is a diagram illustrating a configuration example of a signal processing circuit in the second embodiment of the electronic pen according to this disclosure.

FIG. 11 is a diagram illustrating one example of a signal processing circuit 300A of the electronic pen of this second embodiment. Specifically, in the signal processing circuit 300A of the electronic pen of this second embodiment, a control circuit 54 is provided and a switch circuit 55 is provided between the oscillation circuit 37 and the core body 34. The fixed terminal piece 81 and the movable terminal piece 82 of the switch 8 are electrically connected to the control circuit 54. Furthermore, this control circuit 54 supplies a switching control signal to the switch circuit 55 and supplies a control signal of the oscillation operation of the oscillation circuit 37.

The control circuit 54 monitors the on/off-state of this switch 8 to thereby detect whether or not the present state is the used state of the electronic pen in which the tip part 34a of the core body 34 of the electronic pen main body 3A protrudes from the opening 2b.

Furthermore, when the switch 8 is in the off-state as illustrated in FIG. 10A, the control circuit 54 determines that the electronic pen is in the unused state in which the tip part 34a of the electronic pen main body 3A does not protrude from the opening 2b, and turns off the switch circuit 55 and controls the oscillation circuit 37 to a sleep state (oscillation-stopped state). Due to this, in the unused state of the electronic pen, transmission of the signal from the oscillation circuit 37 from the core body 34 is stopped and the operating state of the oscillation circuit 37 becomes the state of low power consumption, so that the consumption of the stored electrical energy of the electric double-layer capacitor 51 forming the electricity storage device is inhibited. At this time, when the electronic pen is mounted to the charger 310, a charge is efficiently carried out.

Moreover, when the switch 8 is turned on as illustrated in FIG. 10B, the control circuit 54 determines that the electronic pen is in the used state in which the tip part 34a of the electronic pen main body 3A protrudes from the opening 2b, and turns on the switch circuit 55 and controls the oscillation circuit 37 to the operating state. Due to this, in the used state of the electronic pen, the signal from the oscillation circuit 37 is sent out from the core body 34.

In the unused state in which the tip part 34a of the electronic pen main body 3A does not protrude from the opening 2b, the resonant circuit 300R also does not need to be operated. So, as illustrated in FIG. 12, a switch circuit 56 may be provided between the coil 31 and the parallel circuit of the capacitor 38 and the variable-capacitance capacitor 35C and may be on/off-controlled similarly to the switch circuit 55 by a switching control signal from the control circuit 54.

According to the above-described second embodiment, an effect that useless consumption of the stored electricity power of the electricity storage device can be eliminated when the electronic pen is not used is achieved.

Figure 12:
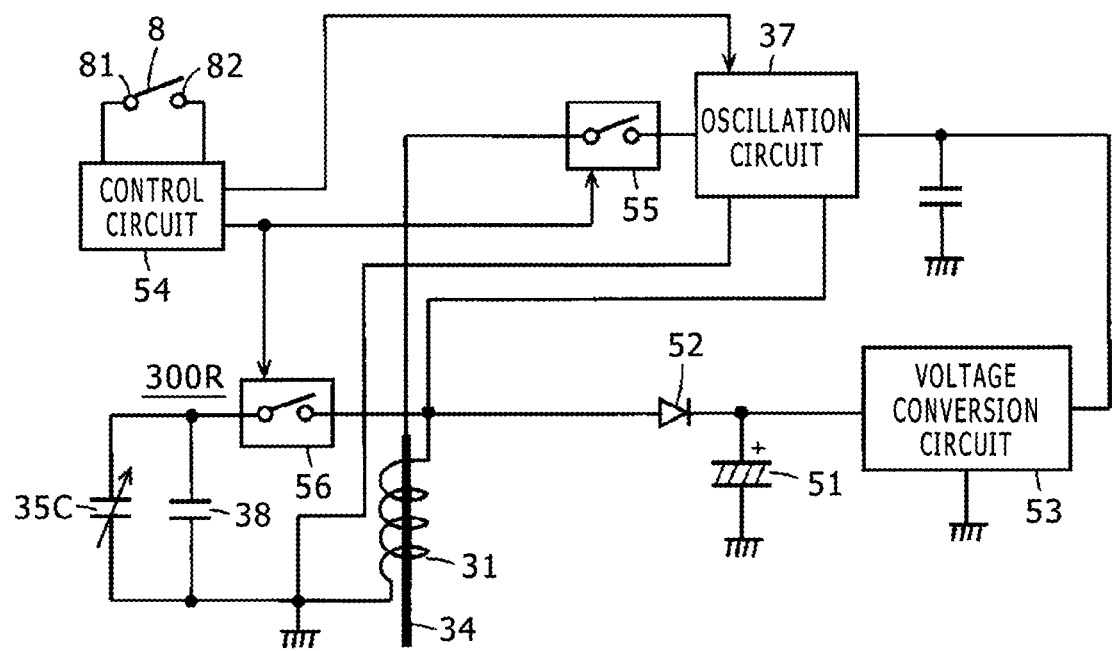
FIG. 12 is a diagram illustrating another configuration example of the signal processing circuit in the second embodiment of the electronic pen according to this disclosure.

Note that in the examples of FIG. 11 and FIG. 12, supply of a signal from the oscillation circuit 37 to the core body 34 is controlled by providing the switch circuit 55 between the oscillation circuit 37 and the core body 34. However, the configuration may be so made that the signal transmission from the core body 34 is stopped by providing the switch circuit 55 on the supply path of the supply voltage from the voltage conversion circuit 53 to the oscillation circuit 37 and stopping the power supply to the oscillation circuit 37 to thereby stop the oscillation of the oscillation circuit 37.

Third Embodiment

The above embodiments are the cases of the electronic pen with the configuration in which the electronic pen main body is housed in the chassis. However, this disclosure is not limited to an electronic pen of a type in which such an electronic pen main body is configured to be replaceable as a cartridge format, and it goes without saying that all functional components of the electronic pen main body may be configured to be lined up in the chassis of the electronic pen. The third embodiment is an example of the electronic pen configured that way.

Furthermore, in this third embodiment, the electronic pen is configured to be capable of being switched to a dedicated electronic pen between an electronic pen for a position detecting device of the electromagnetic induction system and an electronic pen for a position detecting device of the capacitive coupling system.

Figure 13:
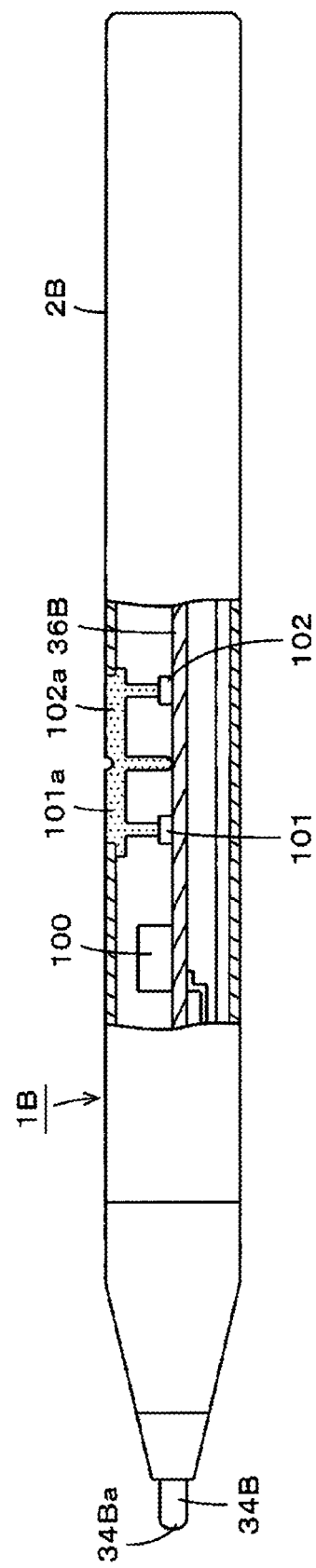
FIG. 13 is a diagram for explaining a third embodiment of the electronic pen according to this disclosure.
Figure 14:
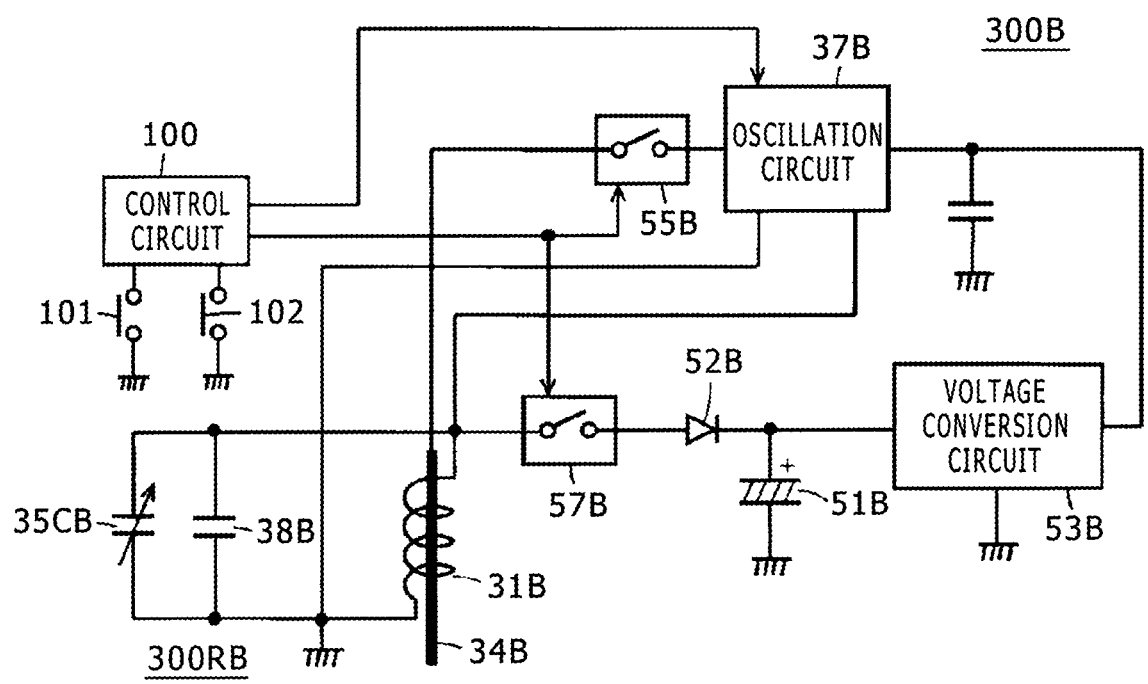
FIG. 14 is a diagram illustrating a configuration example of a signal processing circuit in the third embodiment of the electronic pen according to this disclosure.

FIG. 13 is a diagram for explaining the outline of the whole of an electronic pen 1B of this third embodiment. Furthermore, FIG. 14 is a diagram for explaining an example of a signal processing circuit of the electronic pen of this third embodiment. In the electronic pen 1B of the third embodiment illustrated in FIG. 13 and FIG. 14, the part corresponding to the above-described first embodiment and second embodiment is given what is obtained by adding a suffix B to the same reference number as a reference symbol and description thereof will be made.

As illustrated in FIG. 13, in the electronic pen 1B of this third embodiment, in a tubular chassis 2B, a ferrite core 32B (diagrammatic representation is omitted in FIG. 13) around which a coil 31B (diagrammatic representation is omitted in FIG. 13) is wound and a writing pressure detection circuit 35B (diagrammatic representation is omitted in FIG. 13) are provided and a printed circuit board 36B is provided similarly to the first embodiment described by using FIG. 3B and FIG. 4. Furthermore, a core body 34B is provided to be fitted to the writing pressure detection circuit 35B through a through-hole of the ferrite core 32B in the state in which a tip part 34Ba thereof always protrudes from the opening of the chassis 2B to the external. Also in this third embodiment, the core body 34B is provided with a replaceable configuration similarly to the above-described embodiments.

Moreover, on the printed circuit board 36B, push switches 101 and 102 that are in an on-state when being pressed down and return to an off-state when the pressing-down is stopped are provided. In addition, a control circuit 100 that generates a control signal according to the on/off-state of the push switches 101 and 102 is provided. In addition, in an opening made in a side circumferential surface of the chassis 2B, pressing operation parts 101a and 102a composed of an insulating resin having elasticity, e.g. an acrylonitrile-butadiene-styrene (ABS) resin, are provided. The push switches 101 and 102 are turned on and off by pressing operation of these pressing operation parts 101a and 102a.

Furthermore, when the pressing operation part 101a is operated to be pressed down, the push switch 101 is turned on. In response to this, the control circuit 100 carries out settings to make the electronic pen 1B be an electronic pen for a position detecting device of the electromagnetic induction system. Moreover, when the pressing operation part 102a is operated to be pressed down, the push switch 102 is turned on. In response to this, the control circuit 100 carries out settings to make the electronic pen 1B be an electronic pen for a position detecting device of the capacitive coupling system.

These push switches 101 and 102 and the control circuit 100 are included in a signal processing circuit (diagrammatic representation is omitted in FIG. 13) formed similarly to the above-described embodiments on the printed circuit board 36B.

FIG. 14 illustrates a configuration example of a signal processing circuit 300B of this third embodiment. As illustrated in this FIG. 14, in this third embodiment, a resonant circuit 300RB is formed with the coil 31B, a capacitor 38B provided on the printed circuit board 36B, and a variable-capacitance capacitor 35CB formed of the writing pressure detection circuit 35B similarly to the above-described embodiments. Furthermore, this resonant circuit 300RB is connected as a circuit that defines the oscillation frequency of an oscillation circuit 37B.

Furthermore, similarly to the above-described embodiments, an induced current induced in the coil 31B according to an external magnetic field is supplied to an electric double-layer capacitor 51B through a rectification diode 52B and thereby the electric double-layer capacitor 51B is charged.

Moreover, in this third embodiment, a switch circuit 55B is provided between the oscillation circuit 37B and the core body 34B and a switch circuit 57B is provided between the coil 31B and the rectification diode 52B. The control circuit 100 switches the switch circuits 55B and 57B according to on/off-operation of the push switches 101 and 102.

In the electronic pen 1B of this third embodiment, when a user presses down the pressing operation part 101a, the push switch 101 is turned on and the control circuit 100 turns off the switch circuits 55B and 57B. Thereupon, in the signal processing circuit 300B of the electronic pen 1B, only the resonant circuit 300RB becomes effective and the electronic pen 1B becomes an electronic pen for the position detecting device of the electromagnetic induction system.

Furthermore, when a user presses down the pressing operation part 102a, the push switch 102 is turned on and the control circuit 100 turns on the switch circuits 55B and 57B. Thereupon, in the signal processing circuit 300B of the electronic pen 1B, the state in which a signal from the oscillation circuit 37B is sent out through the core body 34B is obtained, and the electronic pen 1B becomes an electronic pen for a position detecting device of the capacitive coupling system. In the signal processing circuit 300B of the electronic pen 1B with this configuration for a position detecting device of the capacitive coupling system, the electric double-layer capacitor 51B is charged through the rectification diode 52 by an induced current induced in the coil 31B if the electronic pen 1B is used with a position detecting device including the excitation coil 443 illustrated in FIG. 9.

In the above-described manner, with the electronic pen 1B of this third embodiment, the user carries out pressing-down operation of the pressing operation part 101a or the pressing operation part 102a according to the system of the position detecting device to be used by the user and thereby can use the electronic pen 1B with selective switching of the electronic pen 1B between an electronic pen for a position detecting device of the electromagnetic induction system and an electronic pen for a position detecting device of the capacitive coupling system.

In the configuration of FIG. 14, the switch circuit 55B may be provided on the supply path of the supply voltage between a voltage conversion circuit 53B and the oscillation circuit 37B similarly to the examples of FIG. 11 and FIG. 12.

Furthermore, on the outer circumferential surface of the chassis 2B, means that notifies the user of which of an electronic pen for a position detecting device of the electromagnetic induction system and an electronic pen for a position detecting device of the capacitive coupling system the electronic pen 1B is set to may be provided. For example, by providing a light-emitting diode that is lit according to pressing operation of the pressing operation parts 101a and 102a, the user may be informed of which of an electronic pen for a position detecting device of the electromagnetic induction system and an electronic pen for a position detecting device of the capacitive coupling system the electronic pen 1B is set to. In this case, each one light-emitting diode may be provided corresponding to a respective one of the pressing operation parts 101a and 102a. Alternatively, one light-emitting diode for either a position detecting device of the electromagnetic induction system or a position detecting device of the capacitive coupling system may be provided, and the user may be informed of setting for a position detecting device of the other system when the one light-emitting diode is not lit.

Fourth Embodiment

This fourth embodiment is another example of the case in which all functional components of the electronic pen main body are configured to be lined up in the chassis of the electronic pen similarly to the third embodiment. In the above-described third embodiment, the electronic pen is enabled to be set to a dedicated electronic pen between an electronic pen for a position detecting device of the electromagnetic induction system and an electronic pen for a position detecting device of the capacitive coupling system. However, similarly to the first embodiment, it is also possible to constantly set the resonant circuit and the oscillation circuit to the operating state in the signal processing circuit. Furthermore, the electricity storage device may be not a system that is charged by an induced current in the coil of the resonant circuit but a system that is directly charged by a charger.

Figure 15:
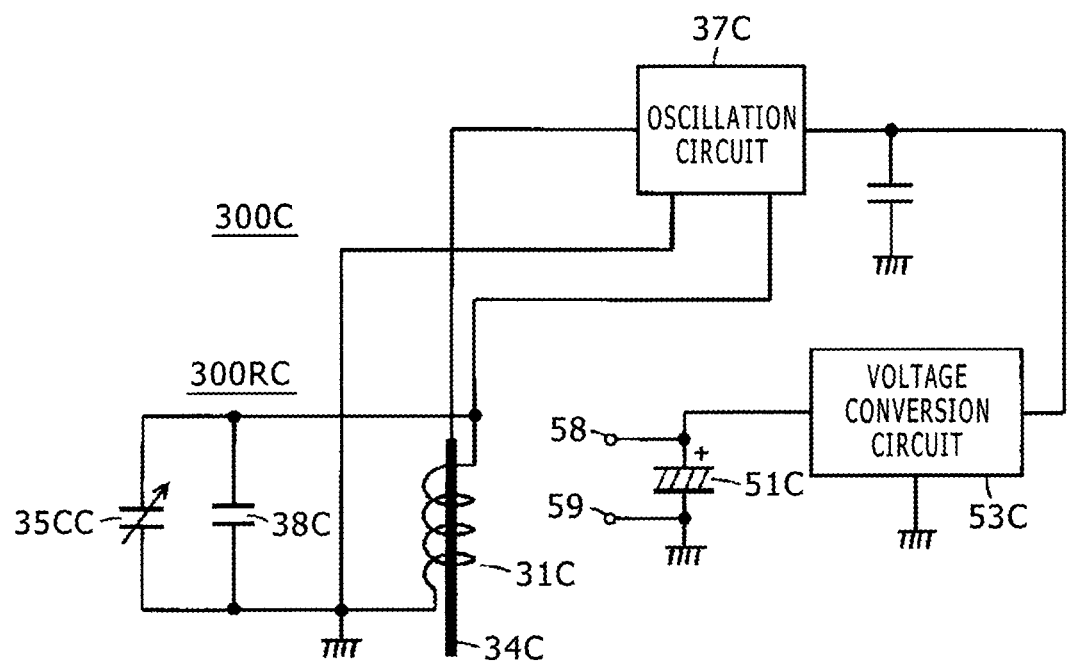
FIG. 15 is a diagram illustrating a configuration example of a signal processing circuit in a fourth embodiment of the electronic pen according to this disclosure.

This fourth embodiment is an example of the case in which the above point is considered. In FIG. 15, a configuration example of a signal processing circuit 300C in the case of an electronic pen 1C of this fourth embodiment is illustrated. In this FIG. 15, the part corresponding to the above-described third embodiment is given what is obtained by adding C instead of the suffix B to the same reference number as a reference symbol and detailed description thereof is omitted.

In the signal processing circuit 300C of the electronic pen 1C of this fourth embodiment, the rectification diode 52B is not provided. Therefore, the signal processing circuit 300C does not have the configuration to charge an electric double-layer capacitor 51C by an induced current induced in a coil 31C of a resonant circuit 300RC. In this fourth embodiment, charge electrodes 58 and 59 are provided to be led out from both terminals of the electric double-layer capacitor 51C. These charge electrodes 58 and 59 are connected to charge electrodes of a charger, for which diagrammatic representation is omitted, and the electric double-layer capacitor 51C is charged by this charger.

Other Embodiments or Modification Examples

In the above-described embodiments, the variable-capacitance capacitor that can vary the capacitance according to the writing pressure is used as the writing pressure detection circuit. However, it goes without saying that the writing pressure detection circuit may be what can vary the inductance value or the resistance value as long as it is a change element that changes the resonance frequency of the resonant circuit.

Furthermore, in the above-described embodiments, the writing pressure detection circuit is provided. However, a switch that is turned on according to the pressure applied to the core body may be provided instead of the writing pressure detection circuit, and the configuration may be so made that the resonant circuit operates when this switch is turned on or the configuration may be so made that the oscillation circuit starts oscillation. Furthermore, a threshold may be set regarding the pressure detected in the writing pressure detection circuit, and the configuration may be so made that the resonant circuit operates when the pressure detected in the writing pressure detection circuit surpasses the threshold or the configuration may be so made that the oscillation circuit starts oscillation.

Moreover, as in the above-described first and second embodiments, it is also possible to provide the electronic pen according to this disclosure with a configuration of a so-called multicolor ballpoint pen in which two or more ballpoint pen cores are provided in a chassis and one ballpoint pen core is selectively set to the use state by a knock mechanism by making the electronic pen main body have the same dimensions as a refill of a commercially-available ballpoint pen.

In addition, in the above-described first and second embodiments, the electronic pen main body is made to have the same dimensions as a refill of a commercially-available ballpoint pen to enable intending compatibility between the chassis of the electronic pens 1 and 1M and the chassis of the commercially-available ballpoint pen. However, it is obvious that the electronic pen main body reduced in thickness can be configured without considering the compatibility with a refill of a commercially-available ballpoint pen.

Furthermore, in the above-described first embodiment, the configuration is so made that the electronic pen main body is protruded and retracted into the chassis based on the knock system by using the knock cam mechanism. However, the electronic pen is not limited to such a knock-type electronic pen and may be an electronic pen with a form in which an electronic pen main body is simply housed in a chassis.

Moreover, in the electronic pens of the above-described first to third embodiments, information on the writing pressure detected in the writing pressure detection circuit is transmitted to a position detecting device as change in the resonance frequency in the resonant circuit. However, the transmitted information is not limited to the information on the writing pressure. For example, a tilt detected by a tilt detecting sensor that detects the tilt of the electronic pen with respect to the sensor surface (indication input surface) may be transmitted as the change in the resonance frequency.

In addition, in the above-described embodiments, the signal generation circuit is so configured as to employ the oscillation signal itself of the oscillation circuit as the signal sent out through the core body. However, the signal generation circuit may be a configured to generate not the oscillation signal itself of the oscillation circuit but a signal obtained by adding some kind of processing to the oscillation signal through modulation of this oscillation signal or the like.

In the above-described embodiments, information on the writing pressure detected in the writing pressure detection circuit is transmitted to a position detecting device as change in the resonance frequency or change in the frequency of the oscillation signal. However, the method for the transmission from the electronic pen to the position detecting device is not limited to such a transmission method. For example, both of an electronic pen of this disclosure and a position detecting device may be provided with a wireless communication circuit of the Bluetooth (registered trademark) standards, for example and the information on the writing pressure may be transmitted through the wireless communication circuit. Furthermore, not only the information on the writing pressure but identification information (ID) of the electronic pen main body or the electronic pen may be transmitted from the electronic pen to the position detecting device through the wireless communication circuit.

DESCRIPTION OF REFERENCE SYMBOLS

1 . . . Electronic pen, 2 . . . Chassis, 2b . . . Opening, 3 . . . Electronic pen main body, 4 . . . Knock cam mechanism, 31 . . . Coil, 32 . . . Ferrite core, 34 . . . Core body, 35 . . . Writing pressure detection circuit, 35C . . . Variable-capacitance capacitor, 36 . . . Printed circuit board, 37 . . . Oscillation circuit, 38 . . . Capacitor, 300R . . . Resonant circuit, 400EMR . . . Position detecting device of electromagnetic induction system, 400AES . . . Position detecting device of capacitive coupling system, 443 . . . Excitation coil

The invention claimed is:

1. An electronic pen comprising:
 a magnetic core that has a through-hole and around which a coil is wound in a direction along the through-hole;
 a core body that is inserted in the through-hole of the magnetic core and has electrical conductivity;
 a capacitor that forms a resonant circuit with the coil;
 a signal generation circuit which, in operation, generates a signal that enables a position of the electronic pen to be detected, the signal being transmitted through the core body;
 a switch electrically coupled between the signal generation circuit and the core body;
 an electricity storage device; and
 a charge circuit which, in operation, charges the electricity storage device by an induced current generated in the coil according to an external magnetic field,
 wherein, while the resonant circuit operates, the signal generated by the signal generation circuit is concurrently transmitted through the core body,
 wherein, in a state in which the electronic pen is used with a first sensor of an electromagnetic induction system, the switch is in a state in which the signal does not flow from the signal generation circuit to the core body, and the electronic pen, in operation, receives electromagnetic energy from the first sensor and returns the received electromagnetic energy to the first sensor by the resonant circuit, charges the electricity storage device by the induced current generated in the coil, and transmits a signal that indicates a position of the electronic pen from the resonance circuit to the first sensor of the electromagnetic induction system, and
 wherein, in a state in which the electronic pen is used with a second sensor of a capacitive coupling system, the switch is in a state in which the signal flows from the signal generation circuit to the core body, and the electronic pen, in operation, transmits the signal generated by the signal generation circuit to the second sensor through the core body.

2. The electronic pen according to claim 1, wherein, in the state in which the electronic pen is used with the sensor of the capacitive coupling system, the electronic pen, in operation, charges the electricity storage device by the induced current generated in the coil if the external magnetic field is received by the electronic pen.

3. The electronic pen according to claim 1, wherein the electronic pen, in operation, charges the electricity storage device by the induced current generated in the coil if the external magnetic field is received by the electronic pen.

4. The electronic pen according to claim 1, further comprising:
 a writing pressure detection circuit,
 wherein one end of the core body inserted in the through-hole of the magnetic core is protruded from the through-hole of the magnetic core and is used as a pen tip, and an end of the core body opposite to the one end that is protruded from the through-hole of the magnetic core is coupled to the writing pressure detection circuit.

5. The electronic pen according to claim 4, wherein the core body is coupled to the writing pressure detection circuit insertably and removably and is replaceable.

6. The electronic pen according to claim 4, wherein the writing pressure detection circuit, in operation, varies a resonance frequency of the resonant circuit according to an applied writing pressure, and is connected to the resonant circuit.

7. The electronic pen according to claim 6, wherein the signal generation circuit includes an oscillation circuit, and the resonant circuit, in operation, varies a frequency of an oscillation signal generated by the oscillation circuit.

8. The electronic pen according to claim 1, further comprising:
 a switch which, in operation, is switched between a state in which the capacitor is connected to the coil and a state in which the capacitor is disconnected from the coil.

9. The electronic pen according to claim 1, further comprising:
 a switch which, in operation, is switched between a state in which the electricity storage device is charged by the induced current generated in the coil according to the external magnetic field and a state in which a charge to the electricity storage device is stopped.

10. The electronic pen according to claim 1, further comprising:
 a determination circuit which, in operation, determines whether the electronic pen is in a used state or in an unused state based on an operation state of an operation part that is operable by a user,
 wherein the switch, in operation, is switched to the state in which the signal does not flow from the signal generation circuit to the core body when the determination circuit determines that the electronic pen is in the unused state.

11. The electronic pen according to claim 1, further comprising:
 a determination circuit which, in operation, determines whether the electronic pen is in a used state or in an unused state based on an operation state of an operation part that is operable by a user; and
 a second switch which, in operation, is switched between a state in which the capacitor is connected to the coil and a state in which the capacitor is disconnected from the coil,
 wherein the switch, in operation, is switched to the state in which the signal does not flow from the signal generation circuit to the core body and the second switch is switched to the state in which the capacitor is disconnected from the coil when the determining circuit determines that the electronic pen is in the unused state.

12. An electronic pen comprising:
a tubular chassis in which an opening is made on one end in an axial center direction serving as a pen tip side and another end is closed; and
an electronic pen main body housed in the tubular chassis, wherein the electronic pen main body includes:
  a magnetic core that has a through-hole and around which a coil is wound in a direction along the through-hole,
  a core body that is inserted in the through-hole of the magnetic core and has electrical conductivity,
  a capacitor that forms a resonant circuit with the coil,
  a signal generation circuit which, in operation, generates a signal that enables a position of the electronic pen main body to be detected, the signal being transmitted through the core body,
  a switch electrically coupled between the signal generation circuit and the core body;
  an electricity storage device, and
  a charge circuit which, in operation, charges the electricity storage device by an induced current generated in the coil according to an external magnetic field,
wherein, while the resonant circuit operates, the signal generated by the signal generation circuit is concurrently transmitted through the core body,
wherein, in a state in which the electronic pen is used with a first sensor of an electromagnetic induction system, the switch is in a state in which the signal does not flow from the signal generation circuit to the core body, and the electronic pen, in operation, receives electromagnetic energy from the first sensor and returns the received electromagnetic energy to the first sensor by the resonant circuit, charges the electricity storage device by the induced current generated in the coil, and transmits a signal that indicates a position of the electronic pen from the resonance circuit to the first sensor of the electromagnetic induction system, and
wherein, in a state in which the electronic pen is used with a second sensor of a capacitive coupling system, the switch is in a state in which the signal flows from the signal generation circuit to the core body, and the electronic pen, in operation, transmits the signal generated by the signal generation circuit to the second sensor through the core body.

13. The electronic pen according to claim 12, further comprising:
a knock mechanism of a knock-type ballpoint pen coupled to the electronic pen main body in the chassis.

14. The electronic pen according to claim 13, further comprising:
a detection circuit which, in operation, detects whether the electronic pen is set to a used state in which part of the core body protrudes externally from the chassis through the opening by operation of the knock mechanism or is set to an unused state in which all of the core body is located inside the chassis, and
a second switch which, in operation, is switched between a state in which the capacitor is connected to the coil and a state in which the capacitor is disconnected from the coil,
wherein, in operation, the switch is switched to the state in which the signal does not flow from the signal generation circuit to the core body and the second switch is switched to the state in which the capacitor is disconnected from the coil when the detection circuit detects that the electronic pen is set to the unused state in which all of the core body is located inside the chassis.

15. An electronic pen main body having at least a pen tip housed in a tubular chassis of an electronic pen, the pen tip being protrudable from an opening on one side of the tubular chassis in an axial center direction, the electronic pen main body comprising:
a magnetic core that has a through-hole and around which a coil is wound in a direction along the through-hole;
a core body that is inserted in the through-hole of the magnetic core and has electrical conductivity;
a capacitor that forms a resonant circuit with the coil;
a signal generation circuit which, in operation, generates a signal that enables a position of the electronic pen main body to be detected, the signal being transmitted through the core body;
a switch electrically coupled between the signal generation circuit and the core body;
an electricity storage device; and
a charge circuit which, in operation, charges the electricity storage device by an induced current generated in the coil according to an external magnetic field,
wherein, while the resonant circuit operates, the signal generated by the signal generation circuit is concurrently transmitted through the core body,
wherein, in a state in which the electronic pen is used with a first sensor of an electromagnetic induction system, the switch is in a state in which the signal does not flow from the signal generation circuit to the core body, and the electronic pen, in operation, receives electromagnetic energy from the first sensor and returns the received electromagnetic energy to the first sensor by the resonant circuit, charges the electricity storage device by the induced current generated in the coil, and transmits a signal that indicates a position of the electronic pen from the resonance circuit to the first sensor of the electromagnetic induction system, and
wherein, in a state in which the electronic pen is used with a second sensor of a capacitive coupling system, the switch is in a state in which the signal flows from the signal generation circuit to the core body, and the electronic pen main body, in operation, transmits the signal generated by the signal generation circuit to the second sensor through the core body.

* * * * *